US012456414B2

(12) United States Patent
Liu et al.

(10) Patent No.: US 12,456,414 B2
(45) Date of Patent: Oct. 28, 2025

(54) GATE DRIVING UNIT AND DISPLAY DEVICE INCLUDING FREQUENCY DIVISION CONTROL MODULE

(71) Applicant: WUHAN CHINA STAR OPTOELECTRONICS SEMICONDUCTOR DISPLAY TECHNOLOGY CO., LTD., Wuhan (CN)

(72) Inventors: Yi Liu, Wuhan (CN); Feixiang Sun, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 18/278,148

(22) PCT Filed: Jul. 20, 2023

(86) PCT No.: PCT/CN2023/108494
§ 371 (c)(1),
(2) Date: Aug. 21, 2023

(87) PCT Pub. No.: WO2024/250393
PCT Pub. Date: Dec. 12, 2024

(65) Prior Publication Data
US 2025/0029542 A1    Jan. 23, 2025

(30) Foreign Application Priority Data
Jun. 6, 2023   (CN) .......................... 202310669220.2

(51) Int. Cl.
*G09G 3/3266*   (2016.01)
*G09G 3/32*     (2016.01)
(Continued)

(52) U.S. Cl.
CPC ............. *G09G 3/32* (2013.01); *G09G 3/3266* (2013.01); *G09G 3/20* (2013.01); *G09G 3/2074* (2013.01);
(Continued)

(58) Field of Classification Search
CPC ...... G09G 3/32; G09G 3/3266; G09G 3/3208; G09G 3/3233; G09G 3/3677; G09G 3/20;
(Continued)

(56) References Cited

U.S. PATENT DOCUMENTS

2013/0293529 A1* 11/2013 You ...................... G09G 3/3611
                                                                345/212
2022/0076611 A1*  3/2022 Lai ........................ G09G 3/2092
(Continued)

FOREIGN PATENT DOCUMENTS

CN    106205461 A    12/2016
CN    110515488 A    11/2019
(Continued)

OTHER PUBLICATIONS

PCT International Search Report for International Application No. PCT/CN2023/108494, mailed on Jan. 20, 2024.
(Continued)

*Primary Examiner* — Adam J Snyder
(74) *Attorney, Agent, or Firm* — The Roy Gross Law Firm, LLC; Roy D. Gross

(57) ABSTRACT

The present application provides a gate driving unit and a display device, where the gate driving unit includes a plurality of gate driving circuits and a frequency division control line for transmitting a frequency division control signal to the plurality of gate driving circuits. Each of the gate driving circuits includes a frequency division control module, an output module and a frequency division control module, where the frequency division control module con-
(Continued)

trols signal transmission between the output module and one of a first node and a second node according to a frequency division control signal and a signal from the first node or the second node of the frequency division control module.

18 Claims, 15 Drawing Sheets

(51) Int. Cl.
  *G09G 3/20* (2006.01)
  *G09G 3/3208* (2016.01)
  *G09G 3/3233* (2016.01)
  *G09G 3/36* (2006.01)
(52) U.S. Cl.
  CPC ......... *G09G 3/3208* (2013.01); *G09G 3/3233* (2013.01); *G09G 3/3677* (2013.01); *G09G 2300/0426* (2013.01); *G09G 2310/0202* (2013.01); *G09G 2310/0243* (2013.01); *G09G 2310/0264* (2013.01); *G09G 2310/0267* (2013.01); *G09G 2310/08* (2013.01); *G09G 2320/02* (2013.01); *G09G 2330/021* (2013.01); *G09G 2330/023* (2013.01); *G09G 2340/0435* (2013.01)
(58) Field of Classification Search
  CPC ......... G09G 3/2074; G09G 2300/0426; G09G 2310/0202; G09G 2310/0243; G09G 2310/0264; G09G 2310/0267; G09G 2310/08; G09G 2320/02; G09G 2330/021; G09G 2330/023; G09G 2340/0435
  See application file for complete search history.

(56) References Cited

U.S. PATENT DOCUMENTS

| 2022/0076618 A1* | 3/2022 | Lai ........................ G09G 3/3266 |
| 2022/0270542 A1 | 8/2022 | Park et al. |

FOREIGN PATENT DOCUMENTS

| CN | 113178161 A | 7/2021 |
| CN | 217788008 U | 11/2022 |
| CN | 115953978 A | 4/2023 |
| CN | 116072044 A | 5/2023 |
| KR | 20210144400 A | 11/2021 |
| KR | 20220000023 A | 1/2022 |

OTHER PUBLICATIONS

PCT Written Opinion of the International Searching Authority for International application No. PCT/CN2023/108494, mailed on Jan. 20, 2024.
Korean Office Action issued in corresponding Korean Patent Application No. 10-2023-7033713 dated Aug. 31, 2024, pp. 1-5.

* cited by examiner

GATE DRIVING UNIT AND DISPLAY DEVICE INCLUDING FREQUENCY DIVISION CONTROL MODULE

CROSS REFERENCE TO RELATED APPLICATIONS

This application is a National Phase of PCT Patent Application No. PCT/CN2023/108494 having International filing date of Jul. 20, 2023, which claims the benefit of priority of Chinese Patent Application No. 202310669220.2, filed Jun. 6, 2023, the contents of which are all incorporated herein by reference in their entirety.

TECHNICAL FIELD

The present application relates to the field of display technologies, and more particularly to a gate driving unit and a display device.

BACKGROUND

Power consumption of a display panel can be reduced by using a frequency conversion technology in the display panel. However, in a practical application, various portions of a display area of the display panel display different display contents corresponding to different application scenarios, respectively. If one display area corresponding to static display or lower content switching frequency and another display area corresponding to dynamic display or higher content switching frequency in a display screen adopt the same refresh frequency, it is still not conducive to reducing the power consumption of the display panel. Therefore, how to make the display panel have different refresh frequencies corresponding to different areas to realize driving of the display panel in a frequency division manner may become a research hotspot.

SUMMARY

Embodiments of the present application provide a gate driving unit and a display device, which can facilitate driving of the display panel in a frequency division manner.

The present application provides a gate driving unit, including a frequency division control line and a plurality of cascaded gate driving circuits, where the frequency division control line transmits a frequency division control signal to the plurality of cascaded gate driving circuits, and each of the gate driving circuits includes a stage transmission module, an output module, and a frequency division control module. The stage transmission module receives an upper-stage stage transmission signal and outputs a current-stage stage transmission signal to a lower-stage of gate driving circuit. The output module is electrically connected to a first node and a second node in the stage transmission module, and outputs a gate control signal according to the frequency division control signal and a signal from the first node or the second node. The frequency division control module is electrically connected between the stage transmission module and the output module, and controls signal transmission between the output module and one of the first node and the second node according to the signal from the first node or the second node and the frequency division control signal.

The present application also provides a display device, including the gate driving unit of any one of the foregoings and a display panel. The display panel includes a plurality of sub-pixels and a plurality of scanning lines, where each of the sub-pixels includes a light emitting device and a pixel driving circuit for driving the light emitting device to emit light, and the pixel driving circuit includes at least one transistor. Gate control signals output from the plurality of gate driving circuits are transmitted to control terminals of the transistors of the plurality of pixel driving circuits via the plurality of scanning lines.

BENEFICIAL EFFECTS

Compared with the related art, according to the gate driving unit and the display device provided in the embodiments of the present application, the gate driving unit includes the frequency division control line and the plurality of cascaded gate driving circuits, where the frequency division control line transmits the frequency division control signal to the plurality of cascaded gate driving circuits. Each of the gate driving circuits includes the stage transmission module, the output module, and the frequency division control module electrically connected between the stage transmission module and the output module, and the frequency division control module controls signal transmission between the output module and one of the first node and the second node according to the signal from the first node or the second node and the frequency division control signal. By disposing the stage transmission module to output the current-stage stage transmission signal, the plurality of cascaded gate driving circuits can be enabled to perform stage transmission arrangement. By disposing the frequency division control module to control transmission of the signal between the output module and one of the first node and the second node of the stage transmission module, the output module can generate the gate control signal according to the signal from the first node or the second node and the frequency division control signal. By enabling the display device to include the gate driving unit, the gate control signals output from the plurality of cascaded gate driving circuits can be transmitted to the control terminals of at least one transistor included in the pixel driving circuits of the plurality of sub-pixels via the plurality of scanning lines. Therefore, display frequencies of respective sub-pixels in a display period are controlled according to the gate control signals output from the plurality of cascaded gate driving circuits, so that the sub-pixels located in different display areas can in turn realize display requirements of different refresh frequencies, to realize the driving of the display panel in the frequency division manner.

DETAILED DESCRIPTION

Figure 1A:
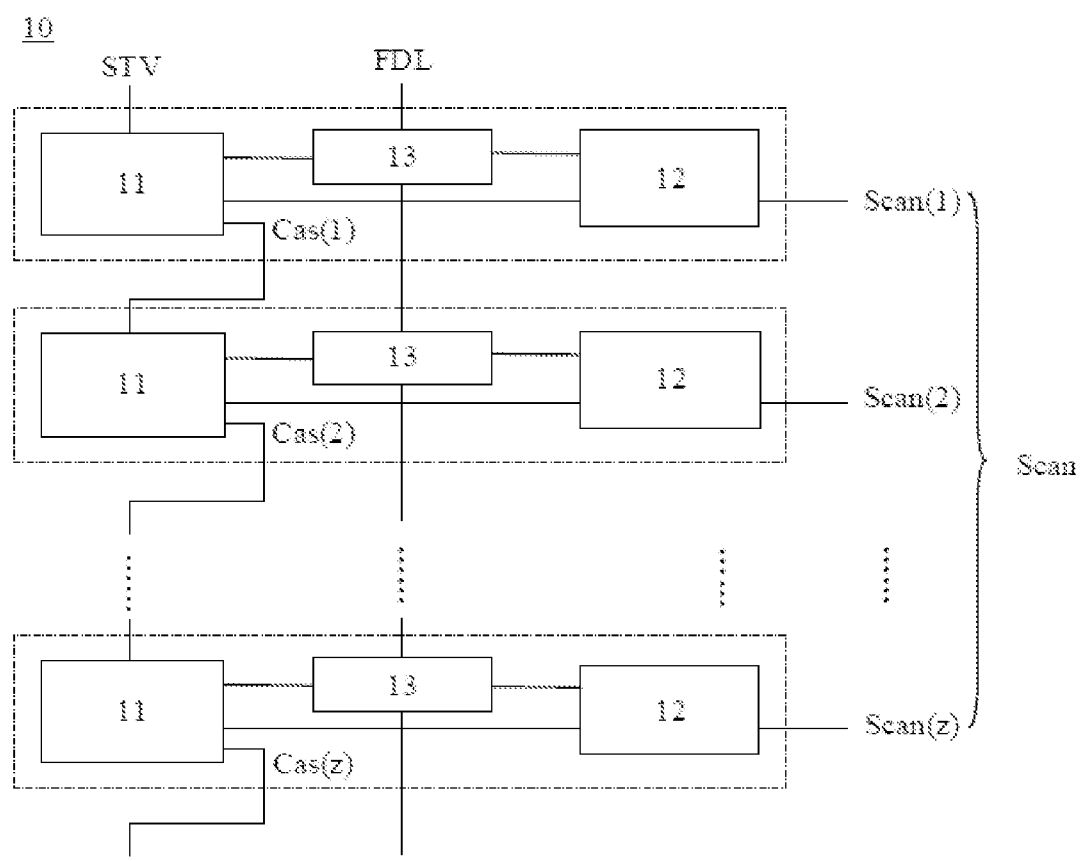
FIGS. 1A-1H are schematic structural diagrams of a gate driving circuit according to an embodiment of the present application.

To make the objectives, technical solutions, and effects of the present application more clear and definite, the present application is illustrated in detail below by referring to the accompanying drawings and illustrating the embodiments. It should be understood that the specific implementations described here are only used to explain the present application, and are not used to limit the present application.

Specifically, the present application implements stage transmission arrangement with the stage transmission module included in the gate driving circuit, enables the frequency division control module to control electrical connection between the output module and one of the first node and the second node in the stage transmission module according to the signal from the first node or the second node in the stage transmission module and the frequency division control signal by including the frequency division control module in the gate driving circuit, so that the output module can generate the gate control signal according to the signal from the first node or the second node and the frequency division control signal.

By enabling the frequency division control module to include a first control transistor having a control terminal electrically connected to the first node or the second node, the first control transistor can be in an off state at a phase in which the current-stage stage transmission signal keeps outputting a valid level state according to the signal from the first node or the second node, thereby reducing an impact on a pulse width of a valid pulse of the gate control signal output from the output module in the phase due to change of a level state of a frequency division control signal. In turn, a pulse switching problem is improved that, in a phase in which the corresponding one of the stage transmission signals keeps outputting a valid level state, the output module can implements an electrical connection with the stage transmission module or disconnection from the stage transmission module only at the time of changing the level state of the frequency division control signal, which causes the gate control signal output from the output module to have an inconsistent level state before and after changing the level state of the frequency division control signal and a time period of outputting the valid level state by the gate control signal (i.e., a pulse width corresponding to the valid pulse) to be shortened.

Specifically, FIGS. 1A-1H are schematic structural diagrams of a gate driving circuit 10 according to an embodiment of the present application. An embodiment of the present application provides a gate driving unit 10 including a frequency division control line FDL and a plurality of cascaded gate driving circuits.

The frequency division control line FDL transmits the frequency division control signal FD to the plurality of cascaded gate driving circuits.

The plurality of cascaded gate driving circuits are configured to output a plurality of gate control signals Scan. Each of the gate driving circuits includes a stage transmission module 11, an output module 12, and a frequency division control module 13.

The stage transmission module 11 receives an upper-stage stage transmission signal Cas(C−1) and outputs a current-stage stage transmission signal Cas(C) to a lower-stage of gate driving circuit so that the plurality of cascaded gate driving circuits can implement the stage transmission arrangement according to the received upper-stage stage transmission signal Cas(C−1) and the outputted current-stage stage transmission signal Cas(C), where, C≥2.

Alternatively, The first gate driving circuit of the plurality of cascaded gate driving circuits can use a start signal STV as the upper-stage stage transmission signal to output the current-stage stage transmission signal Cas(1) to the lower-stage of gate driving circuit according to the start signal STV.

Referring still to FIGS. 1A-1H, the output module 12 is electrically connected to a first node N1 and a second node N2 in the stage transmission module 11, and outputs a gate control signal Scan according to the frequency division control signal FD and signals from the first node N1 and the second node N2.

The frequency division control module 13 is electrically connected between the stage transmission module 11 and the output module 12. The frequency division control module 13 controls signal transmission between the output module 12 and one of the first node N1 and the second node N2 according to a signal from the first node N1 or the second node N2 and the frequency division control signal FD so that the output module 12 can generate the gate control signal Scan according to the frequency division control signal FD and the signals from the first node N1 and the second node N2 on the basis of the output module 12 being electrically connected to the other of the first node N1 and the second node N2 directly, thereby realizing control of an output state of the gate control signal Scan. As such, when the gate driving unit 10 is applied to the display device, the driving of the display device in the frequency division manner can be realized by controlling the gate control signal Scan generated by the plurality of cascaded gate driving circuits.

Alternatively, specific connection forms between the output module 12 and the stage transmission module 11 may be different depending on different types of transistors in a demand circuit (such as the pixel driving circuit) to which the gate control signal Scan is applied.

Referring still to FIGS. 1B-1E, if the transistor to which the gate control signal Scan is applied in the demand circuit is of an N-type, a valid pulse of the gate control signal Scan is a state in which the gate control signal Scan corresponds to a high level, and an invalid pulse of the gate control signal Scan is a state in which the gate control signal Scan corresponds to a low level. The output module 12 and the second node N2 can be electrically connected with each other directly, and the output module 12 and the first node N1 are electrically connected via the frequency division control module 13. Correspondingly, the frequency division control module 13 controls signal transmission between the output module 12 and the first node N1 according to a signal from the first node N1 or the second node N2 and the frequency division control signal FD so that the output module 12 can generate the gate control signal Scan according to the frequency division control signal FD and the signals from the first node N1 and the second node N2 on the basis of the output module 12 being electrically connected to the second node N2 directly.

Figure 1B:
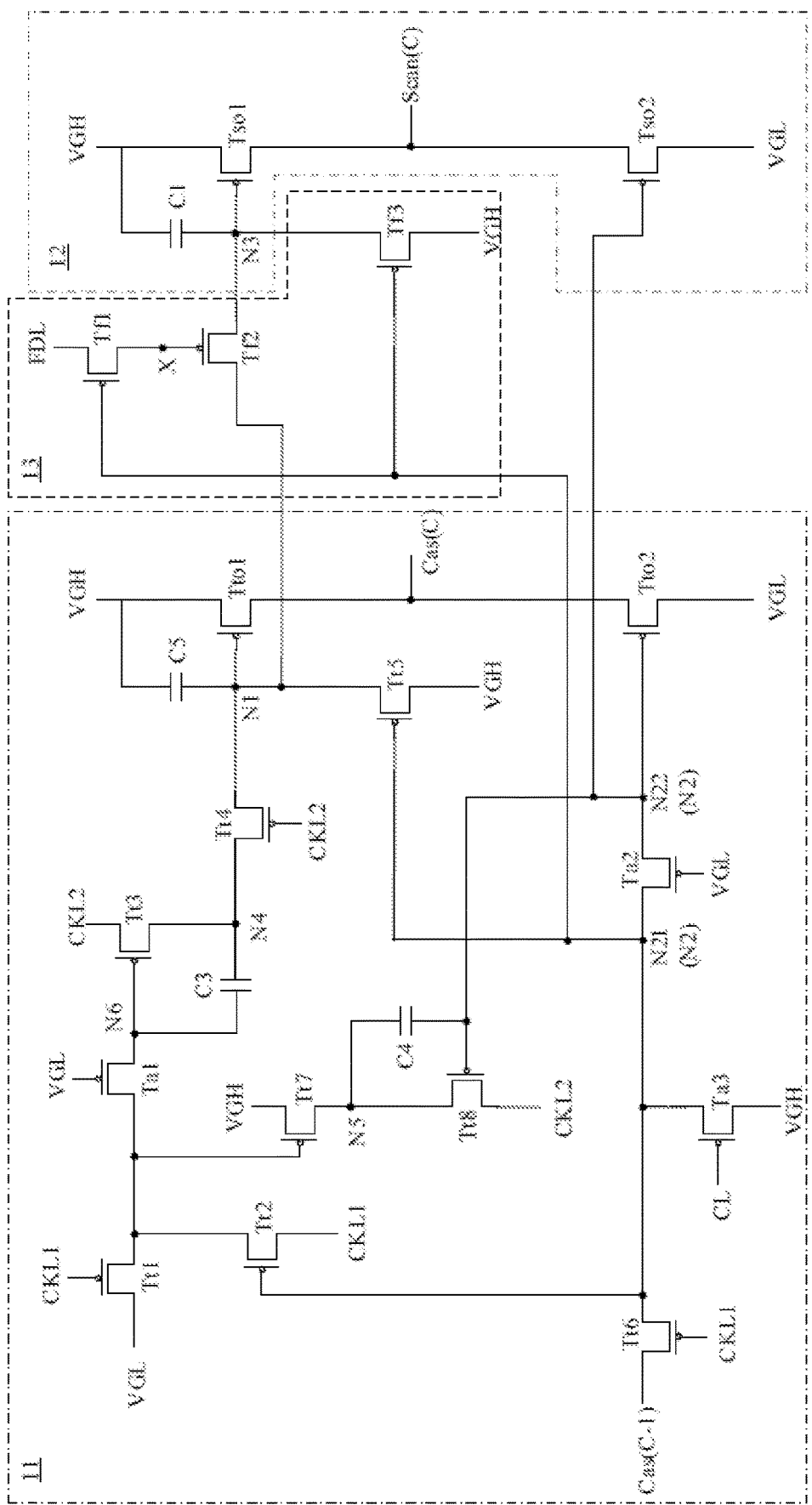
Figure 1C:
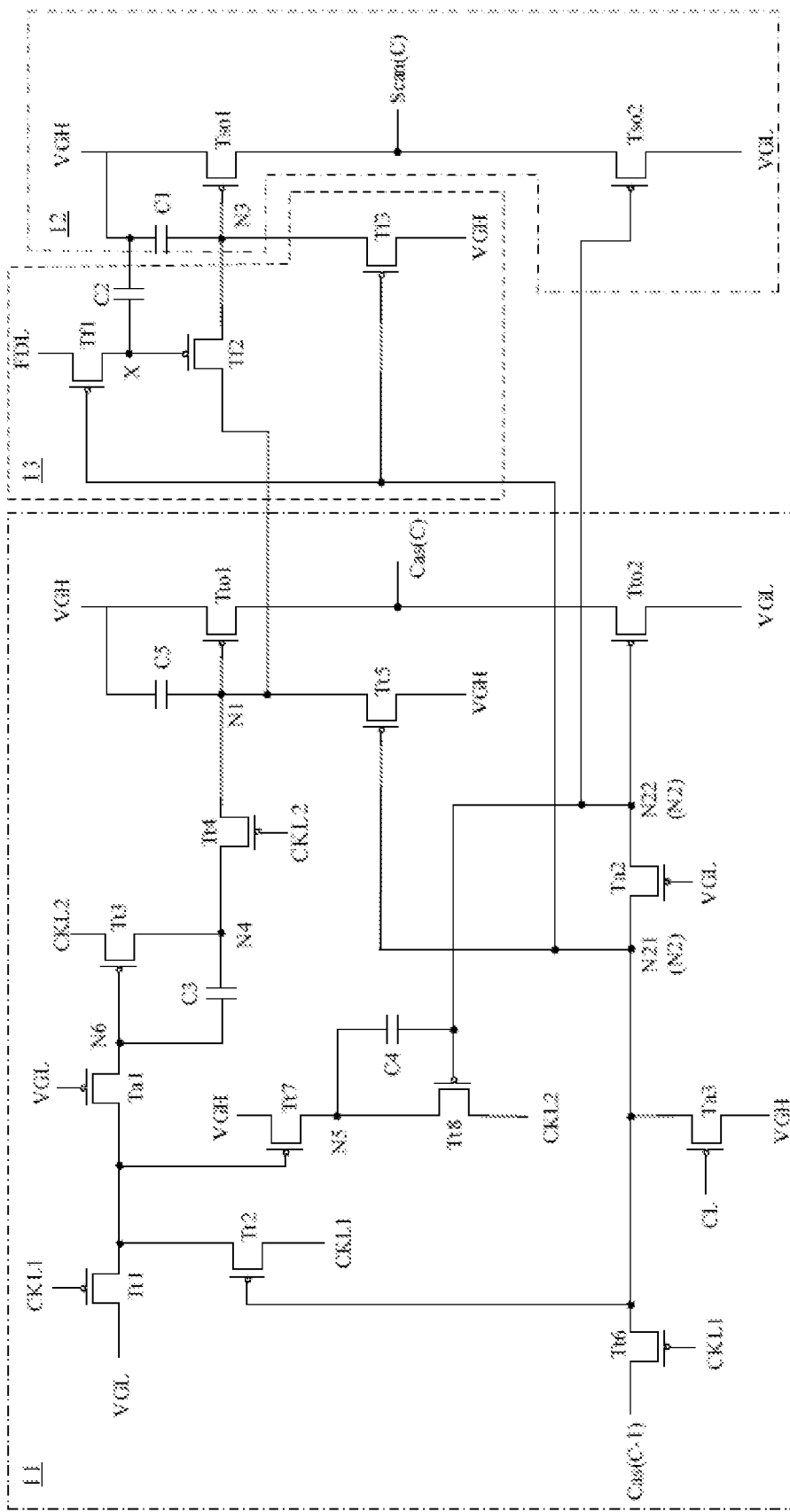
Figure 1D:
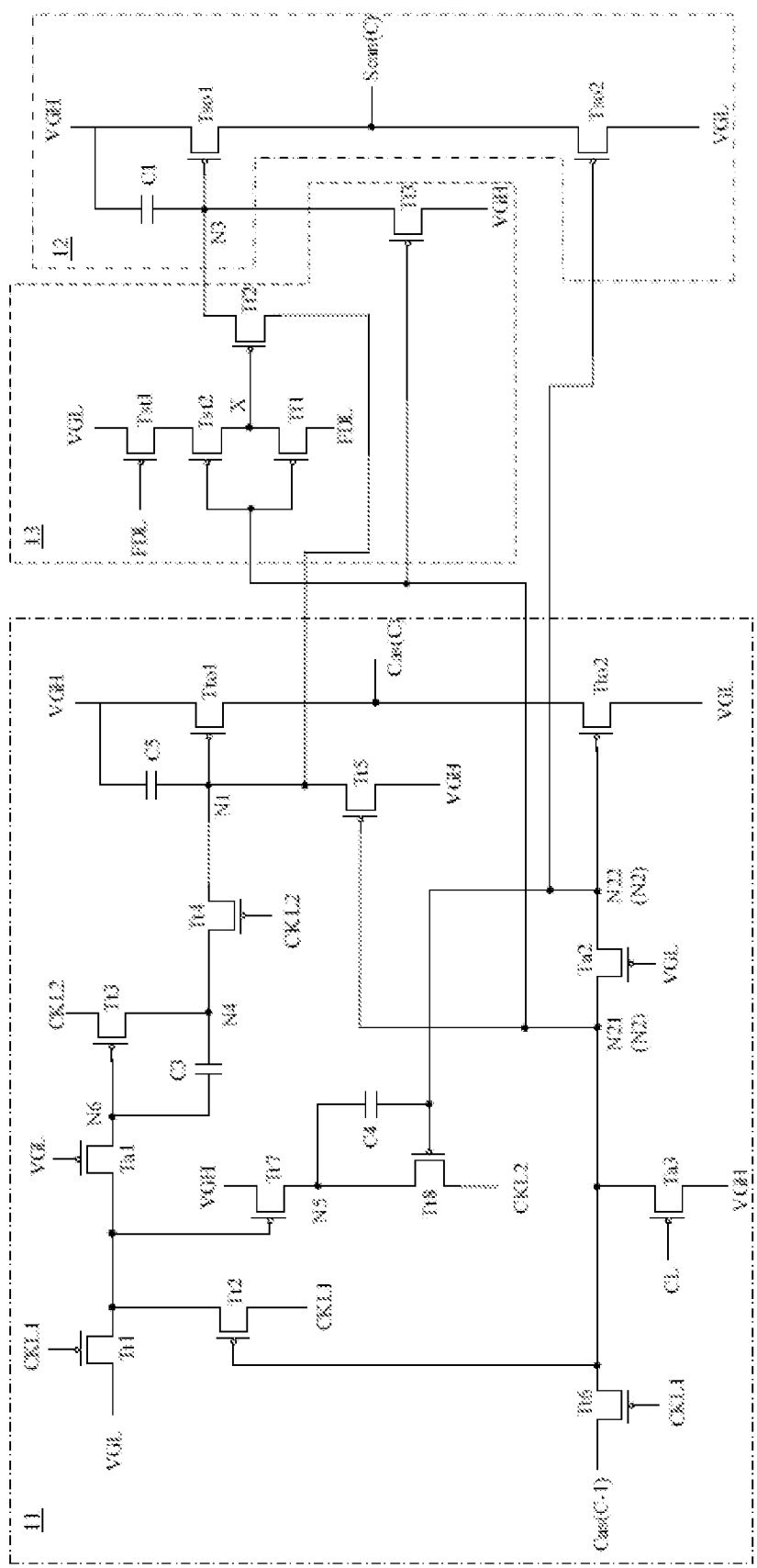
Figure 1E:
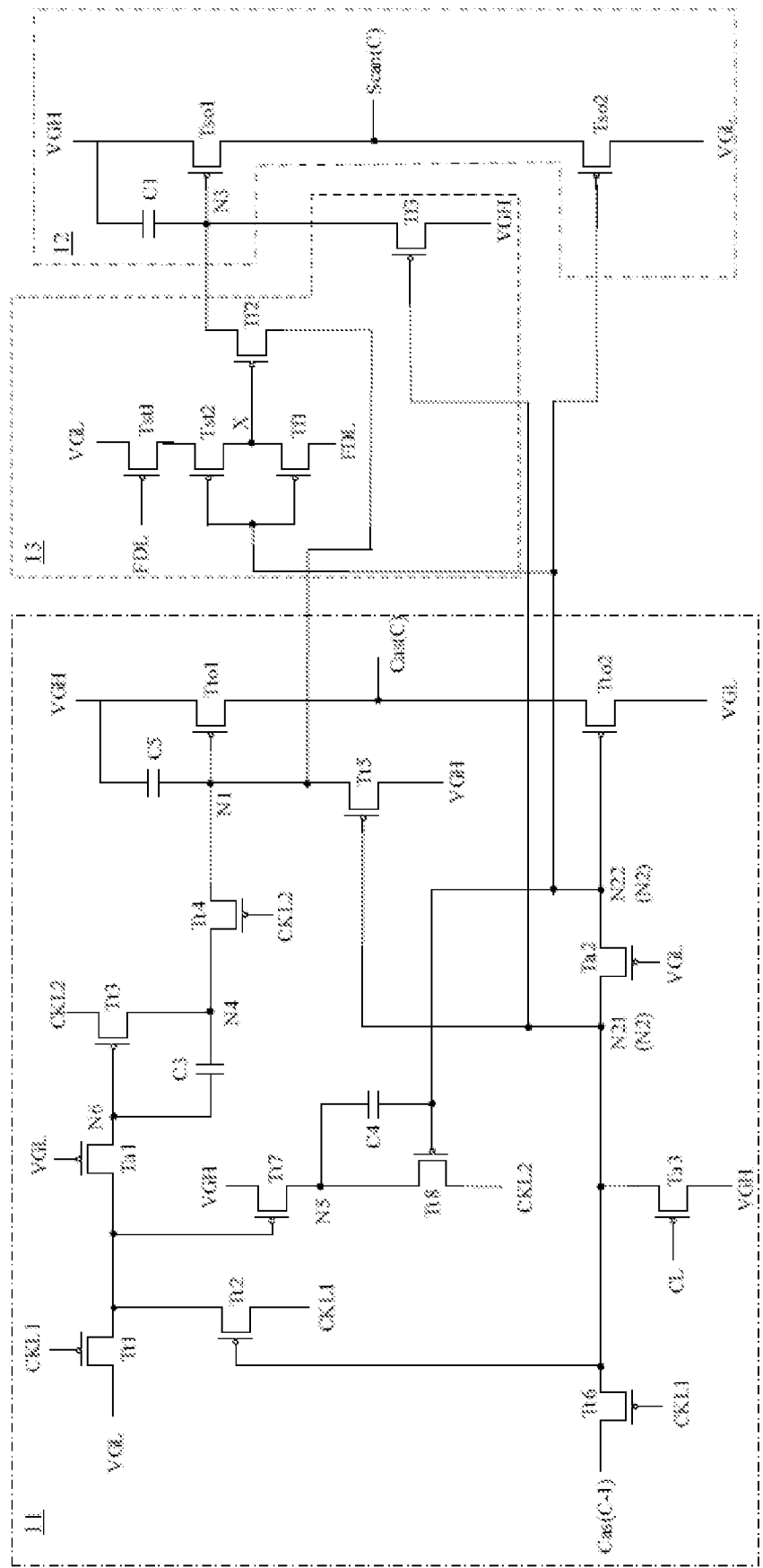
Figure 1F:
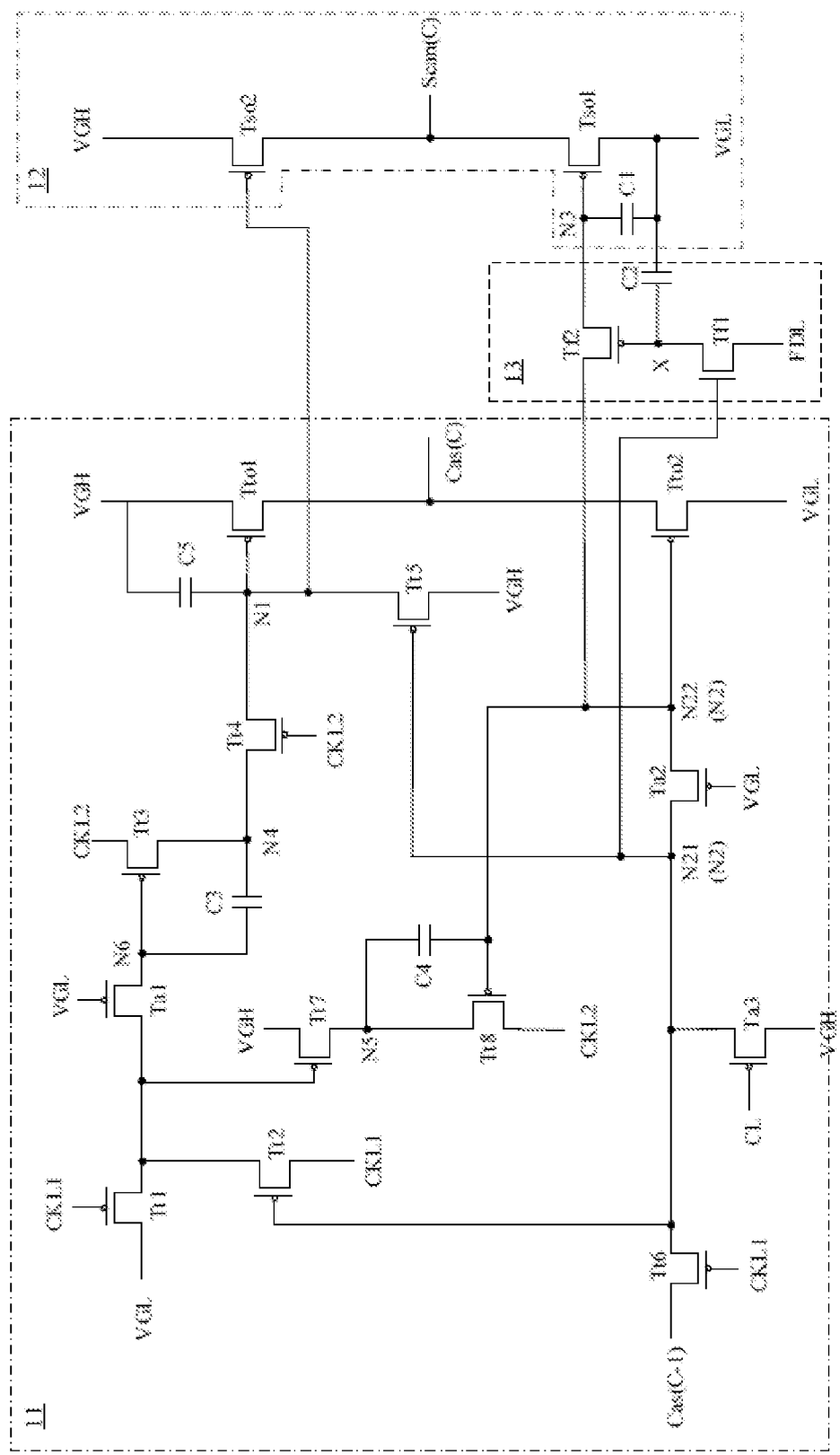

Referring still to FIG. 1F, if the transistor to which the gate control signal Scan is applied in the demand circuit is of an P-type, a valid pulse of the gate control signal Scan is a state in which the gate control signal Scan corresponds to a low level, and an invalid pulse of the gate control signal Scan is a state in which the gate control signal Scan corresponds to a high level. The output module 12 and the first node N1 can be electrically connected with each other directly, and the output module 12 and the second node N2 are electrically connected via the frequency division control module 13. Corresponding, the frequency division control module 13 controls signal transmission between the output module 12 and the second node N2 according to a signal from the first node N1 or the second node N2 and the frequency division control signal FD so that the output module 12 can generate the gate control signal Scan according to the frequency division control signal FD and the signals from the first node N1 and the second node N2 on the basis of the output module 12 being electrically connected to the first node N1 directly. It should be understood that, when the transistor to which the gate control signal Scan is applied in the demand circuit is of a P-type, the structure of the output module 12 may also be provided with reference to FIGS. 1B-1E.

Alternatively, referring still to FIGS. 1A-1H, the output module 12 includes a first output transistor Tso1, a second output transistor Tso2, and a first capacitor C1.

The first output transistor Tso1 has a control terminal electrically connected to the frequency division control module 13 via the third node N3, an input terminal electrically connected to a first voltage terminal, and an output terminal electrically connected to a signal output terminal of the gate driving circuit outputting the gate control signal Scan.

The second output transistor Tso2 has a control terminal electrically connected to the other of the first node N1 and the second node N2, an input terminal electrically connected to a second voltage terminal, and an output terminal electrically connected to the signal output terminal.

The first capacitor C1 is connected in series between the input terminal of the first output transistor Tso1 and the control terminal of the first output transistor Tso1.

Alternatively, if the transistor to which the gate control signal Scan is applied in the demand circuit is of the N-type, the control terminal of the second output transistor Tso2 is electrically connected to the second node N2, as shown in FIGS. 1B-1E and 1H. If the transistor to which the gate control signal Scan is applied in the demand circuit is of the P-type, the control terminal of the second output transistor Tso2 is electrically connected to the first node N1, as shown in FIG. 1F.

Alternatively, referring still to FIGS. 1A-1H, the frequency division control module 13 includes a first control transistor Tf1 and a second control transistor Tf2.

The first control transistor Tf1 has a control terminal electrically connected to the first node N1 or the second node N2, and an input terminal electrically connected to the frequency division control line FDL. The second control transistor Tf2 has a control terminal electrically connected to an output terminal of the first control transistor Tf1, an input terminal electrically connected to one of the first node N1 and the second node N2, and an output terminal electrically connected to the output module 12 via the third node N3 so that the output terminal of the second control transistor Tf2 is electrically connected to the control terminal of the first output transistor Tso1.

Alternatively, referring still to FIGS. 1B-1E, if the transistor to which the gate control signal Scan is applied in the demand circuit is the N-type, the control terminal of the first control transistor Tf1 may be electrically connected to the second node N2, and the first control transistor Tf1 and the second control transistor Tf2 are configured to control an electrical connection between the first node N1 and the third node N3 according to the signal of the second node N2 and the frequency division control signal FD so that the gate control signal Scan output from the gate driving circuit meets an use requirement. Alternatively, the first control transistor Tf1 includes a P-type transistor.

Figure 1G:
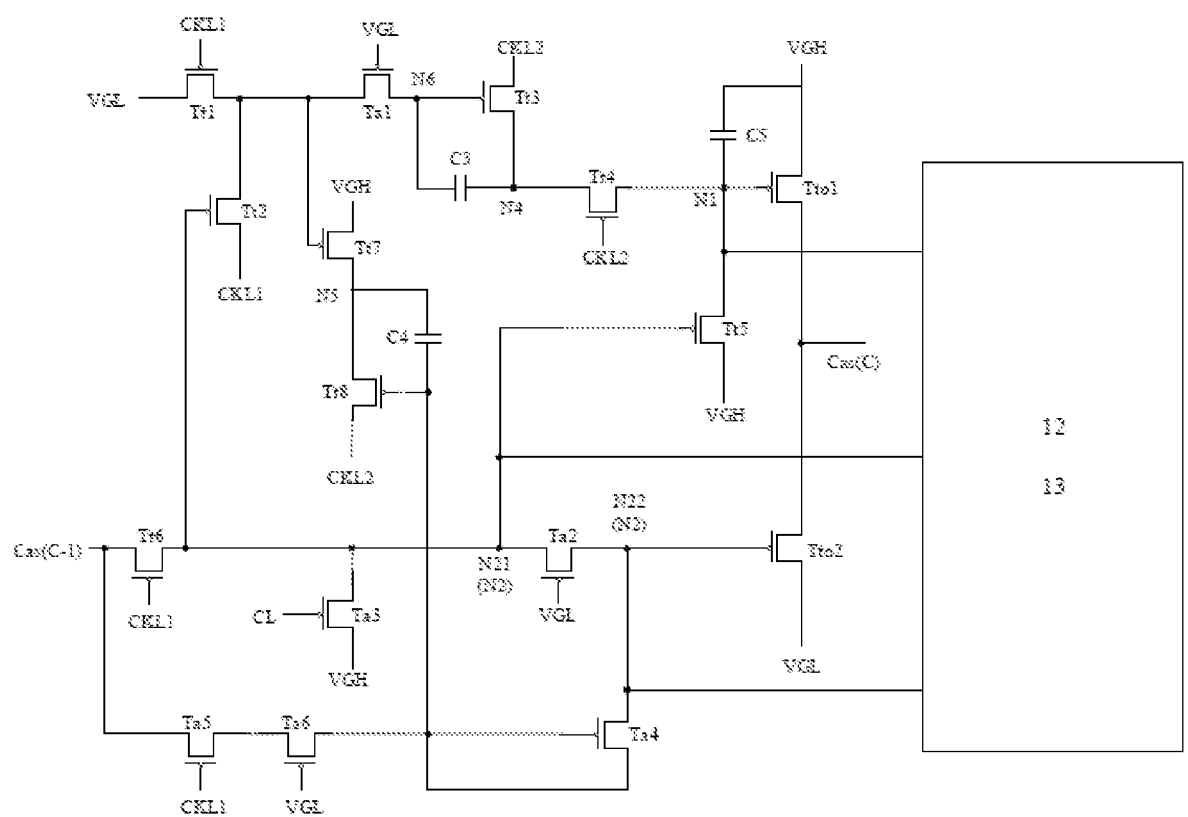
Figure 1H:
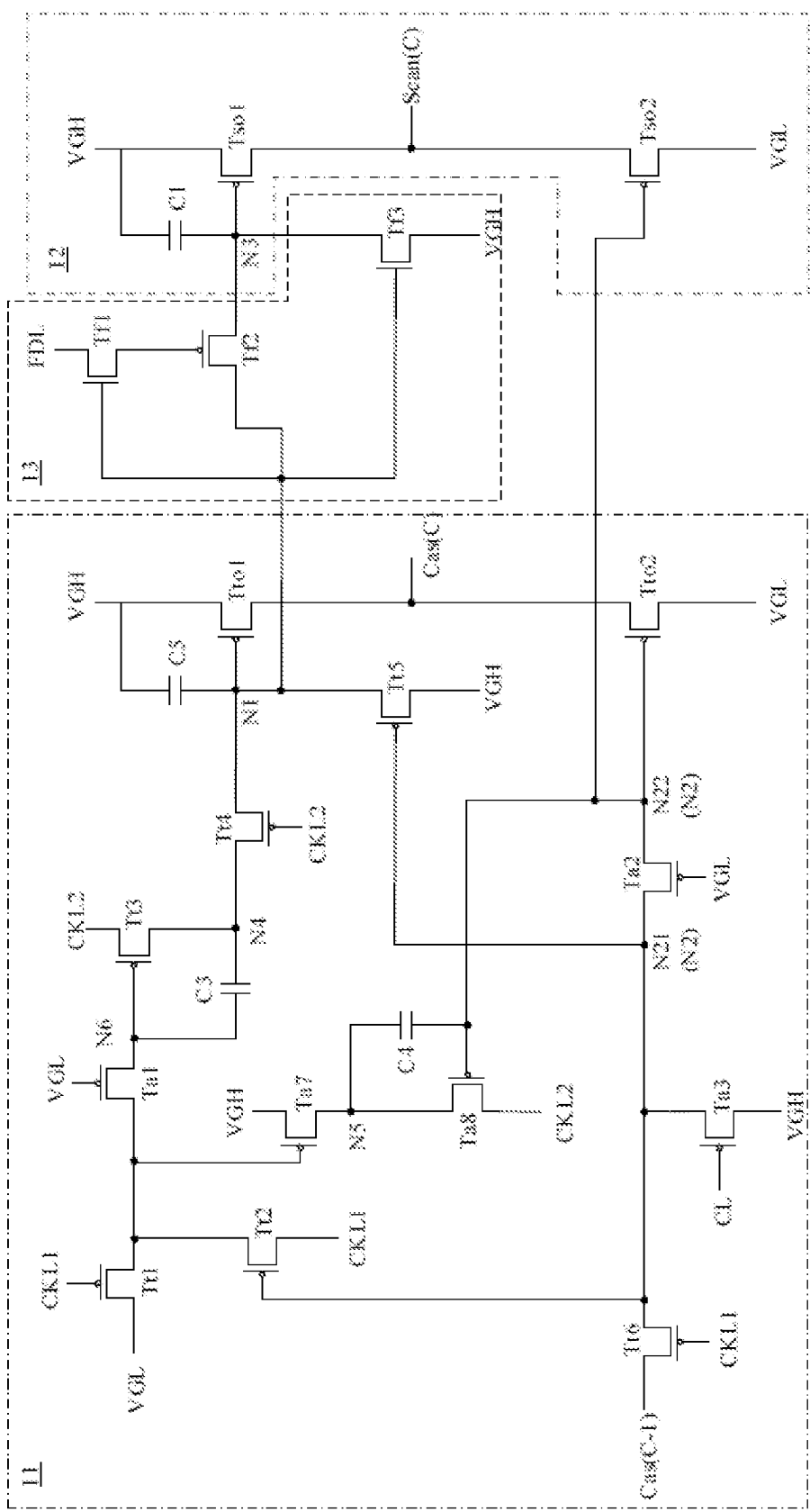

Alternatively, referring still to FIG. 1H, if the transistor to which the gate control signal Scan is applied in the demand circuit is the N-type, the control terminal of the first control transistor Tf1 may be electrically connected to the first node N1, and the first control transistor Tf1 and the second control transistor Tf2 are configured to control an electrical connection between the first node N1 and the third node N3 according to the signal of the first node N1 and the frequency division control signal FD. Alternatively, in order to avoid the pulse switching problem that the valid pulse of the gate control signal Scan is narrow when a level jump occurs in the frequency division control signal FD, the first control transistor Tf1 includes an N-type transistor so that the first control transistor Tf1 is in an off state in a phase in which the current-stage stage transmission signal outputted by the current-stage gate driving circuit has a valid level, thereby enabling the gate control signal Scan output from the gate driving circuit to meet the use requirement, and improving the pulse switching problem.

Alternatively, referring still to FIG. 1F, if the transistor to which the gate control signal Scan is applied in the demand circuit is the P-type, the control terminal of the first control transistor Tf1 may be electrically connected to the second node N2, and the first control transistor Tf1 and the second control transistor Tf2 are configured to control an electrical connection between the second node N2 and the third node N3 according to the signal of the second node N2 and the frequency division control signal FD so that the gate control signal Scan output from the gate driving circuit meets the use requirement. Alternatively, the first control transistor Tf1 includes an N-type transistor.

Alternatively, if the transistor to which the gate control signal Scan is applied in the demand circuit is the P-type, the control terminal of the first control transistor Tf1 may be electrically connected to the first node N1, and the first control transistor Tf1 and the second control transistor Tf2 are configured to control an electrical connection between the second node N2 and the third node N3 according to the signal of the first node N1 and the frequency division control signal FD. Alternatively, in order to avoid the pulse switching problem that the valid pulse of the gate control signal Scan is narrow when a level jump occurs in the frequency division control signal FD, the first control transistor Tf1 includes a P-type transistor so that the first control transistor Tf1 is in an off state in a phase in which the current-stage stage transmission signal outputted by the current-stage gate driving circuit has a valid level, thereby enabling the gate control signal Scan output from the gate driving circuit to meet the use requirement, and improving the pulse switching problem.

Alternatively, the input terminal of the second control transistor Tf2 is electrically connected to the first node N1, and a first voltage transmitted from the first voltage terminal is greater than a second voltage transmitted from the second voltage terminal, so as to implement control of a high level state of the gate control signal Scan outputted from the output module 12 by the frequency division control module 13. As shown in FIGS. 1B-1E and 1H, the first voltage terminal is VGH and the second voltage terminal is VGL.

Alternatively, the input terminal of the second control transistor Tf2 is electrically connected to the second node N2, and a first voltage transmitted from the first voltage terminal is less than a second voltage transmitted from the second voltage terminal, so as to implement control of a low level state of the gate control signal Scan outputted from the output module 12 by the frequency division control module 13. As shown in FIG. 1F, the first voltage terminal is VGL and the second voltage terminal is VGH.

Figure 2A:
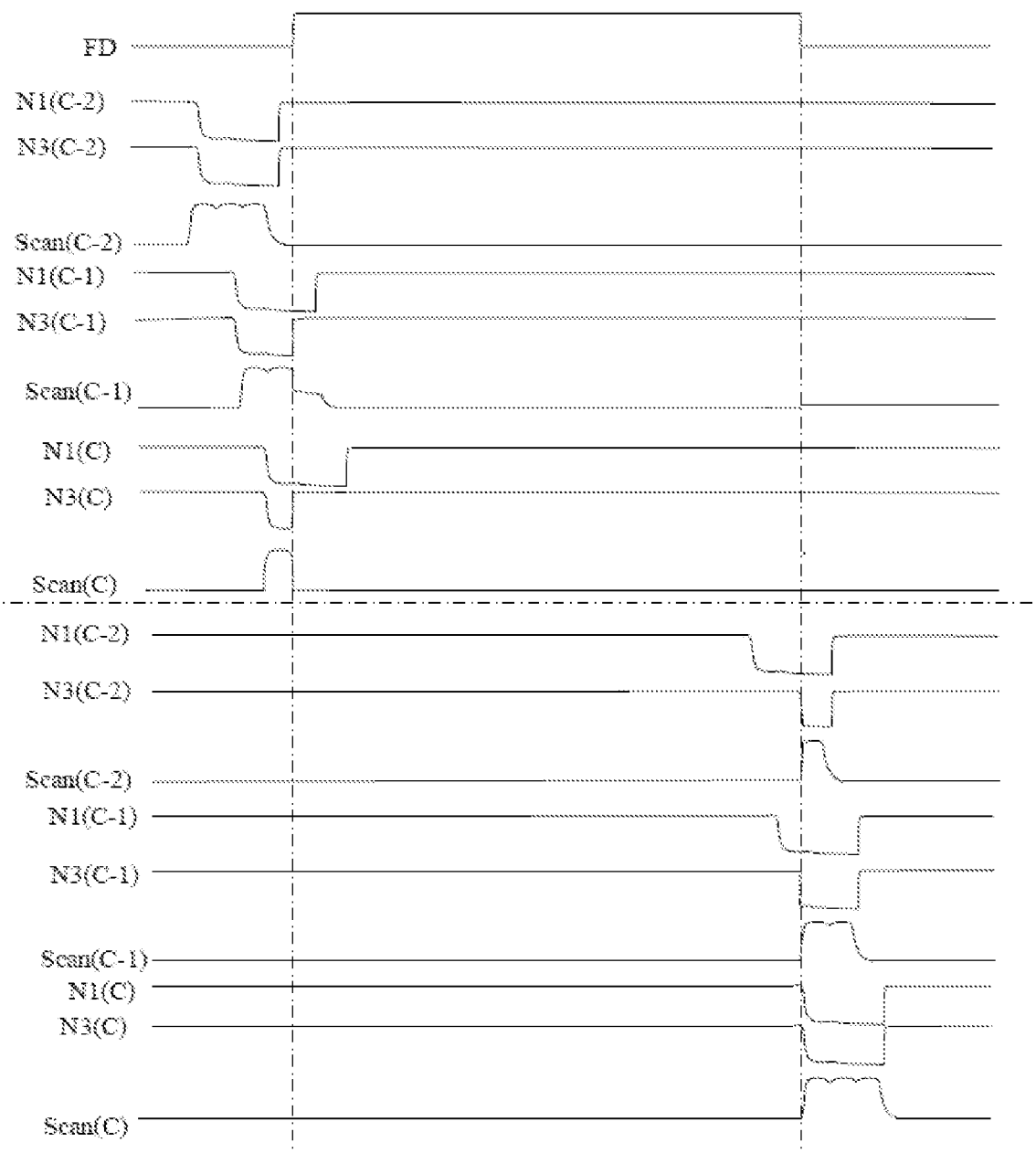
FIG. 2A is a timing diagram when a control terminal of a second control transistor is directly electrically connected to a frequency division control line.

FIG. 2A is a timing diagram when the control terminal of the second control transistor is directly electrically connected to a frequency division control line. The control terminal of the second control transistor Tf2 is directly electrically connected to the frequency division control line FDL, and the potential holding time at the first node N1 or the second node N2 may be different from the potential holding time at the third node N3, thereby influencing the outputted gate control signal Scan.

An example in which the transistor to which the gate control signal Scan is applied in the demand circuit is of the N-type, and the second control transistor Tf2 and the first output transistor Tso1 included in the output module 12 are both of the P-type is taken for illustration. The control terminal of the second control transistor Tf2 is directly electrically connected to the frequency division control line FDL, and the second control transistor Tf2 is turned on only when the frequency division control signal FD transitions from an invalid state of a high level to a valid state of a low level. In this case, before the frequency division control signal FD transitions from the invalid state of the high level to the valid state of the low level, first nodes N1 of a portion of the plurality of gate driving circuits (for example, first nodes N1(C-2) and N1(C-1) of the (C-2)-th stage of gate driving circuit to the (C-1)-th stage of gate driving circuit) are in the valid state of the low level, because the second control transistor Tf2 is in the off state and thus the valid state of the low level at the first nodes N1 cannot be transmitted to the third node N3, so that the stage transmission output terminal can stall keep outputting the valid state of the stage transmission signal Cas and the gate control signal Scan output from the signal output terminal (for example, the gate control lines Scan(C-2) and Scan(C-1) output from the (C-2)-th stage of gate driving circuit to the (C-1)-th stage of gate driving circuit) cannot output the valid state of the high level. After the frequency division control signal FD transitions from the invalid state of the high level to the valid state of the low level, the first nodes N1 of the portion of the plurality of gate driving circuits are in the valid state of the low level, because the second control transistor Tf2 is in an on state and thus the valid state of the low level at the first nodes N1 can be transmitted to the third nodes N3 (for example, third nodes N3(C-2) and N3(C-1) of the (C-2)-th stage of gate driving circuit to the (C-1)-th stage of gate driving circuit), so that the stage transmission output terminal can stall keep outputting the valid state of the stage transmission signal Cas and the gate control signal Scan output from the signal output terminal can also output the valid state of the high level. Thus, a width of the valid pulse of the high level output from the portion of gate driving circuits may become narrower. Therefore, the potential holding time at the first nodes N1 of the portion of gate driving circuits differs from that at the third node N3 of the portion of gate driving circuits before and after the frequency division control signal FD transitions from the invalid state of the high level to the valid state of the low level.

Similarly, the potential holding time at the first nodes N1 of the portion of gate driving circuits also differs from that at the third node N3 of the portion of gate driving circuits before and after the frequency division control signal FD transitions from the invalid state of the low level to the valid state of the high level. Correspondingly, the width of the valid pulse of the high level output from the portion of gate driving circuits may also become narrower, as shown in FIG. 2A.

Similarly, in the case that the transistor to which the gate control signal Scan is applied in the demand circuit is of the P-type and the control terminal of the second control transistor Tf2 is directly electrically connected to the frequency division control line FDL, the potential holding time at the second nodes N2 of the portion of gate driving circuits also differs from that at the third node N3 of the portion of gate driving circuits when the frequency division control signal FD transitions, which in turn causes the width of the valid pulse outputted by the portion of gate driving circuits to be narrow.

In comparison with a design in which the control terminal of the second control transistor Tf2 is directly electrically connected to the frequency division control line FDL, since the frequency division control module 13 is further provided with the first control transistor Tf1, the first node N1 or the second node N2 and the first control transistor Tf1 are combined with the frequency division control line FDL to realize control of turn-on time of the second control transistor Tf2, so that the potential holding time at the first node N1 or the second node N2 is the same as the potential holding time at the third node N3, and then the outputted gate control signal Scan meets the use requirement.

Alternatively, referring still to FIGS. 1C and 1F, in order to further stabilize the outputted gate control signal Scan, the frequency division control module 13 further includes a second capacitor C2 connected in series between the input terminal of the first output transistor Tso1 and the control terminal of the second control transistor Tf2.

Alternatively, referring still to FIGS. 1D-1E, in order to further stabilize the outputted gate control signal Scan, the frequency division control module 13 further includes a first stabilization transistor Tst1 and a second stabilization transistor Tst2.

The first stabilization transistor Tst1 has a control terminal electrically connected to the frequency division control line FDL and an input terminal electrically connected to a second constant voltage terminal. The second stabilization transistor Tst2 has a control terminal electrically connected to the control terminal of the first control transistor Tf1, an input terminal electrically connected to the control terminal of the first control transistor Tst1, and an output terminal electrically connected to the control terminal of the second control transistor Tf2. Alternatively, the second constant voltage terminal is VGL.

Alternatively, referring still to FIGS. 1B-1E, in order to stabilize the outputted gate control signal Scan, the frequency division control module 13 further includes a third control transistor Tf3, having a control terminal electrically connected to the first node N1 or the second node N2, an input terminal electrically connected to a first constant voltage terminal, and an output terminal electrically connected to the control terminal of the first output transistor Tso1. Alternatively, the first constant voltage terminal is VGH.

Alternatively, if the transistor to which the gate control signal Scan is applied in the demand circuit is of the N-type and the third control transistor Tf3 is the N-type transistor, the control terminal of the third control transistor Tf3 is electrically connected to the first node N1. If the transistor to which the gate control signal Scan is applied in the demand circuit is of the N-type and the third control transistor Tf3 is the P-type transistor, the control terminal of the third control transistor Tf3 is electrically connected to the second node N2. If the transistor to which the gate control signal Scan is applied in the demand circuit is of the P-type and the third control transistor Tf3 is the N-type transistor, the control terminal of the third control transistor Tf3 is electrically connected to the second node N2. If the transistor to which the gate control signal Scan is applied in the demand circuit is of the P-type and the third control transistor Tf3 is the P-type transistor, the control terminal of the third control transistor Tf3 is electrically connected to the first node N1.

Alternatively, referring still to FIGS. 1A-1H, the stage transmission module 11 includes a first node control module, a second node control module, and a stage transmission output module.

The first node control module is electrically connected to a clock signal line and the first node N1 and controls a signal from the first node N1 according to a clock signal transmitted via the clock signal line.

Alternatively, the clock signal line includes a first clock signal line CKL1 and a second clock signal line CKL2. The first clock signal line CKL1 is configured to transmit a first clock signal, and the second clock signal line CKL2 is configured to transmit a second clock signal.

The first node control module includes a first transistor Tt1, a second transistor Tt2, a third transistor Tt3, a fourth transistor Tt4, a fifth transistor Tt5, and a third capacitor C3.

A control terminal of the first transistor Tt1 is electrically connected to the first clock signal line CKL1, and an input terminal of the first transistor Tt1 is electrically connected to a third voltage terminal VGL. A control terminal of the second transistor Tt2 is electrically connected to the second node N2, an input terminal of the second transistor Tt2 is electrically connected to the first clock signal line CKL1, and an output terminal of the second transistor Tt2 is electrically connected to an output terminal of the first transistor Tt1. A control terminal of the third transistor Tt3 is electrically connected to the output terminal of the first transistor Tt1, and an input terminal of the third transistor Tt3 is electrically connected to the second clock signal line CKL2. A control terminal of the fourth transistor Tt4 is electrically connected to the second clock signal line CKL2, and an input terminal and an output terminal of the fourth transistor Tt4 are electrically connected to the output terminal of the third transistor Tt3 and the first node N1, respectively. A control terminal of the fifth transistor Tt5 is electrically connected to the second node N2, an input terminal of the fifth transistor Tt5 is electrically connected to a fourth voltage terminal VGH, and an output terminal of the fifth transistor Tt5 is electrically connected to the first node N1. The third capacitor C3 is connected in series between the control terminal of the third transistor Tt3 and the output terminal of the third transistor Tt3.

Alternatively, a third voltage transmitted via the third voltage terminal VGL is less than a fourth voltage transmitted via the fourth voltage terminal VGH. Alternatively, referring still to FIGS. 1B-1E, when the input terminal of the second control transistor Tf2 is electrically connected to the first node N1, the first voltage may be equal to the fourth voltage, and the second voltage may be equal to the third voltage to reduce the number of voltage terminals applied to the gate driving unit 10. Alternatively, referring still to FIG. 1F, when the input terminal of the second control transistor Tf2 is electrically connected to the second node N2, the first voltage may be equal to the third voltage and the second voltage may be equal to the fourth voltage to reduce the number of voltage terminals applied to the gate driving unit 10.

Referring still to FIGS. 1A-1H, the second node control module is electrically connected to the clock signal line and the first node N2 and controls a signal from the first node N2 according to an upper-stage stage transmission signal Cas and the clock signal.

Alternatively, the second node control module includes a sixth transistor Tt6, a seventh transistor Tt7, an eighth transistor Tt8, and a fourth capacitor C4.

A control terminal of the sixth transistor Tt6 is electrically connected to the first clock signal line CKL1, an input terminal of the sixth transistor Tt6 is configured to receive an upper-stage stage transmission signal Cas(C−1), and an output terminal of the sixth transistor Tt6 is electrically connected to the second node N2. A control terminal of the seventh transistor Tt7 is electrically connected to the output terminal of the first transistor Tt1, an input terminal of the seventh transistor Tt7 is electrically connected to the fourth voltage terminal VGH, an output terminal of the seventh transistor Tt7 is electrically connected to an output terminal of the eighth transistor Tt8, an input terminal of the eighth transistor Tt8 is electrically connected to the second clock signal line CKL2, and a control terminal of the eighth transistor Tt8 is electrically connected to the second node N2. The fourth capacitor C4 is connected in series between the control terminal of the eighth transistor Tt8 and the output terminal of the eighth transistor Tt8.

Referring still to FIGS. 1B-1H, the stage transmission output module is electrically connected to the first node N1, the second node N2, and the stage transmission output terminal of the gate driving circuit, and outputs a current-stage stage transmission signal Cas(C) to a lower-stage of gate driving circuit via the stage transmission output terminal according to signals from the first node N1 and the second node N2.

Alternatively, the stage transmission output module includes a first stage transmission output transistor Tto1, a second stage transmission output transistor Tto2, and a fifth capacitor C5.

A control terminal of the first stage transmission output transistor Tto1 is electrically connected to the first node N1, an input terminal of the first stage transmission output transistor Tto1 is electrically connected to the fourth voltage terminal VGH, and an output terminal of the first stage transmission output transistor Tto1 is electrically connected to the stage transmission output terminal. A control terminal of the second stage transmission output transistor Tto2 is electrically connected to the second node N2, an input terminal of the second stage transmission output transistor Tto2 is electrically connected to the third voltage terminal VGL, and an output terminal of the second stage transmission output transistor Tto2 is electrically connected to the stage transmission output terminal. The fifth capacitor C5 is connected in series between the input terminal of the first stage transmission output transistor Tto1 and the control terminal of the first stage transmission output transistor Tto1.

Alternatively, referring still to FIGS. 1B-1H, the stage transmission module 11 further includes a shielding module including a first shielding transistor Ta1 and a second shielding transistor Ta2, where a control terminal of the first shielding transistor Ta1 and a control terminal of the second shielding transistor Ta2 are electrically connected to the third voltage terminal VGL, an input terminal and an output terminal of the first shielding transistor Ta1 are electrically connected to the output terminal of the first transistor Tt1 and the control terminal of the third transistor Tt3, an input terminal of the second shielding transistor Ta2 is electrically connected to an output terminal of the sixth transistor Tt6 via a first sub-node N21, and an output terminal of the second shielding transistor Ta2 is electrically connected to a control terminal of the second stage transmission output transistor Tto2 via the second sub-node N22.

The second node N2 includes a first sub-node N21 and a second sub-node N22. When the control terminal of the first control transistor Tf1 is electrically connected to the second node N2, the control terminal of the first control transistor Tf1 may be electrically connected to one of the first sub-node N21 and the second sub-node N22, and the input terminal of the second control transistor Tf2 is electrically connected to one of the first node N1 and the second sub-node N22.

Alternatively, if the transistor to which the gate control signal Scan is applied in the demand circuit is of the P-type, the input terminal of the second control transistor Tf2 is electrically connected to the second sub-node N22.

Alternatively, the gate control signal Scan outputted by the gate driving circuit may be enabled to meet the use requirement by changing the valid level state of the upper-stage stage transmission signal received by the gate driving circuit. If the transistor to which the gate control signal Scan is applied in the demand circuit is of the P-type transistor, the valid level states of the gate control signal Scan and the stage transmission signal Cas(C) output from the gate driving circuit are low level states, and the valid level state of the upper-stage stage transmission signal Cas(C−1) received by the gate driving circuit is a low level state. If the transistor to which the gate control signal Scan is applied in the demand circuit is of the N-type transistor, the valid level states of the gate control signal Scan and the stage transmission signal Cas(C) output from the gate driving circuit are high level states, and the valid level state of the upper-stage stage transmission signal Cas(C−1) received by the gate driving circuit is a high level state.

Alternatively, referring still to FIGS. 1B-1H, each of the gate driving circuits further includes a power-on reset module including a ninth transistor Ta3, where a control terminal of the ninth transistor Ta3 is electrically connected to a power-on reset control line CL, and an output terminal of the ninth transistor Ta3 is electrically connected to the second node N2. Alternatively, the second stage transmission output transistor Tto2 is the P-type transistor, and the input terminal of the ninth transistor Ta3 is electrically connected to the fourth voltage terminal VGH. The second stage transmission output transistor Tto2 is the N-type transistor, and the input terminal of the ninth transistor Ta3 is electrically connected to the third voltage terminal VGL.

Alternatively, referring still to FIG. 1G, stage transmission module of each of the gate driving circuits may further include a tenth transistor Ta4, an eleventh transistor Ta5, and a twelfth transistor Ta6.

A control terminal of the eleventh transistor Ta5 is electrically connected to a first clock signal line CKL1, and an input terminal and an output terminal of the eleventh transistor Ta5 are electrically connected to then input terminal of the sixth transistor Tt6 and an input terminal of the twelfth transistor Ta6, respectively. A control terminal of the twelfth transistor Ta6 is electrically connected to the third voltage terminal VGL, and an output terminal of the twelfth transistor Ta6 is electrically connected to a control terminal of the tenth transistor Ta4. A control terminal and an input terminal of the tenth transistor Ta4 are electrically connected to the control terminal of the eighth transistor Tt8, and an output terminal of the tenth transistor Ta4 is electrically connected to the control terminal of the second stage transmission output transistor Tto2.

Since the signals at the first node N1 and the second node N2 are inverted at the phase in which the gate control signal Scan outputs the valid level state, the control terminal of the first control transistor Tf1 may be electrically connected to the second node N2, as shown in FIGS. 1B-1F, and the control terminal of the first control transistor Tf1 may also be electrically connected to the first node N1, as shown in FIG. 1H. It should be understood with respect to FIG. 1B that the control terminal of the first control transistor Tf1 in FIG. 1H is electrically connected to the first node N1. Similarly, a design in which the control terminal of the first control transistor Tf1 in the gate driving circuit shown in FIGS. 1C-1F is electrically connected to the first node N1 can be further obtained.

Figure 2B:
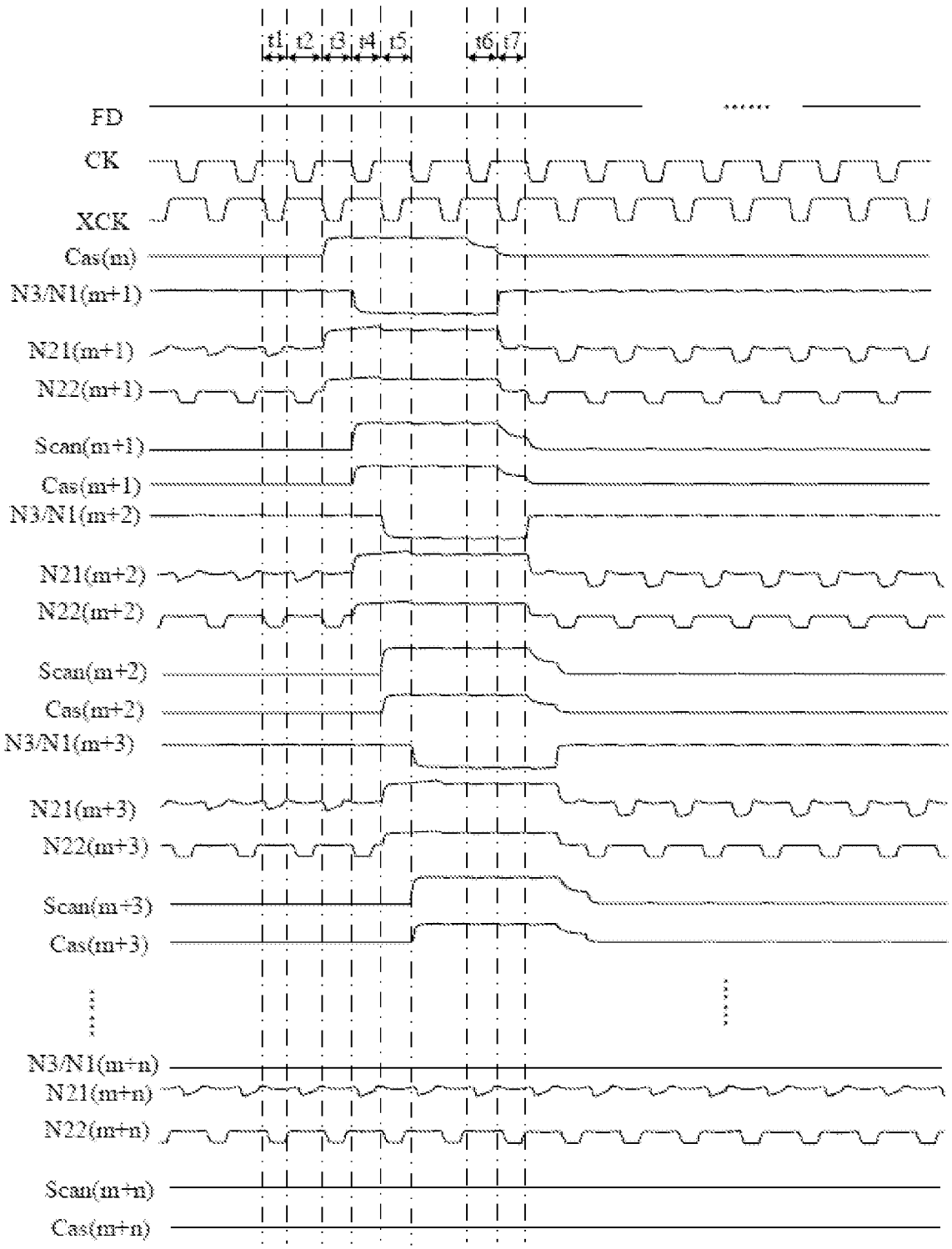
FIGS. 2B-2D are timing diagrams of a gate driving circuit according to an embodiment of the present application.
Figure 2C:
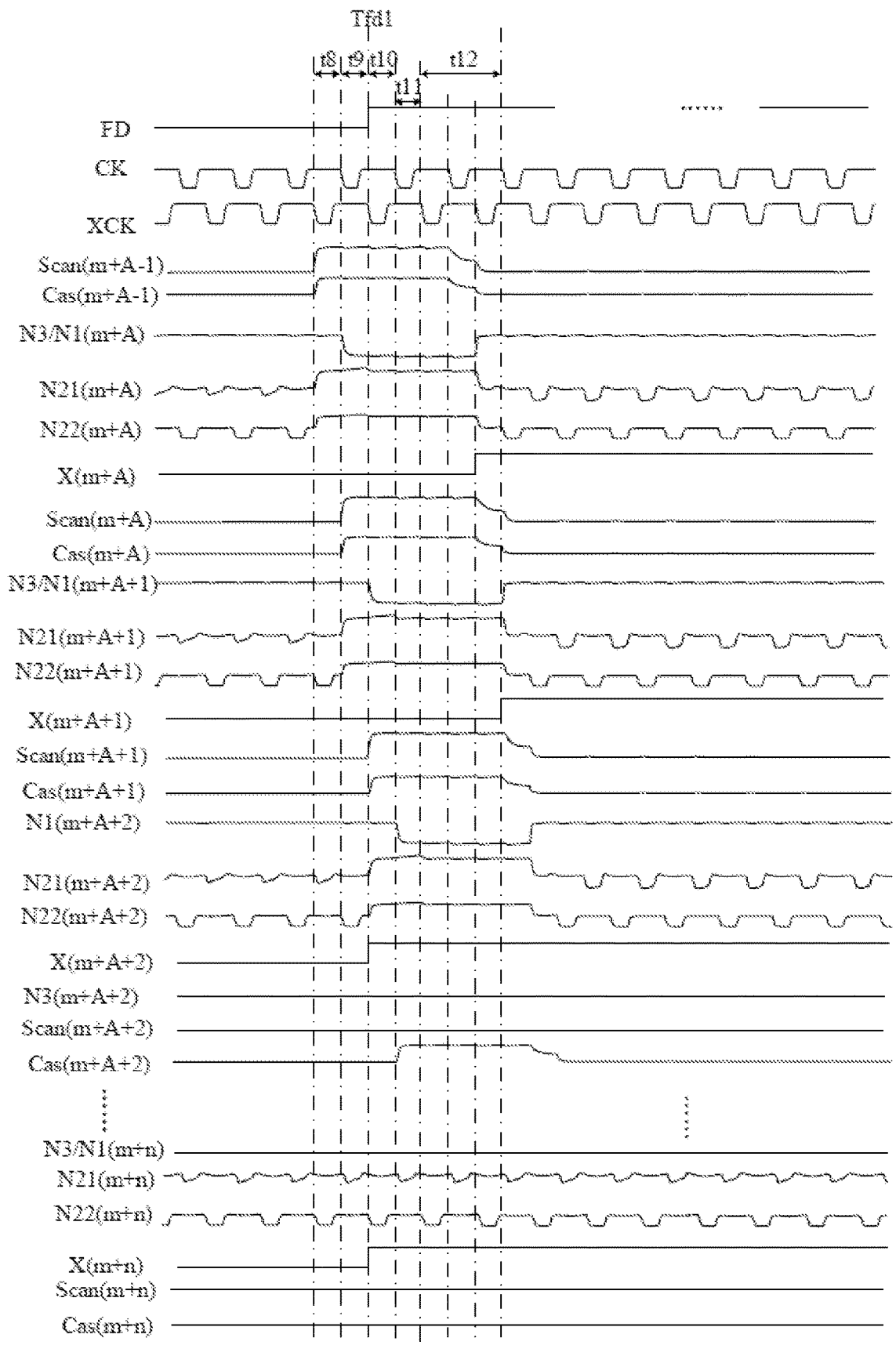
Figure 2D:
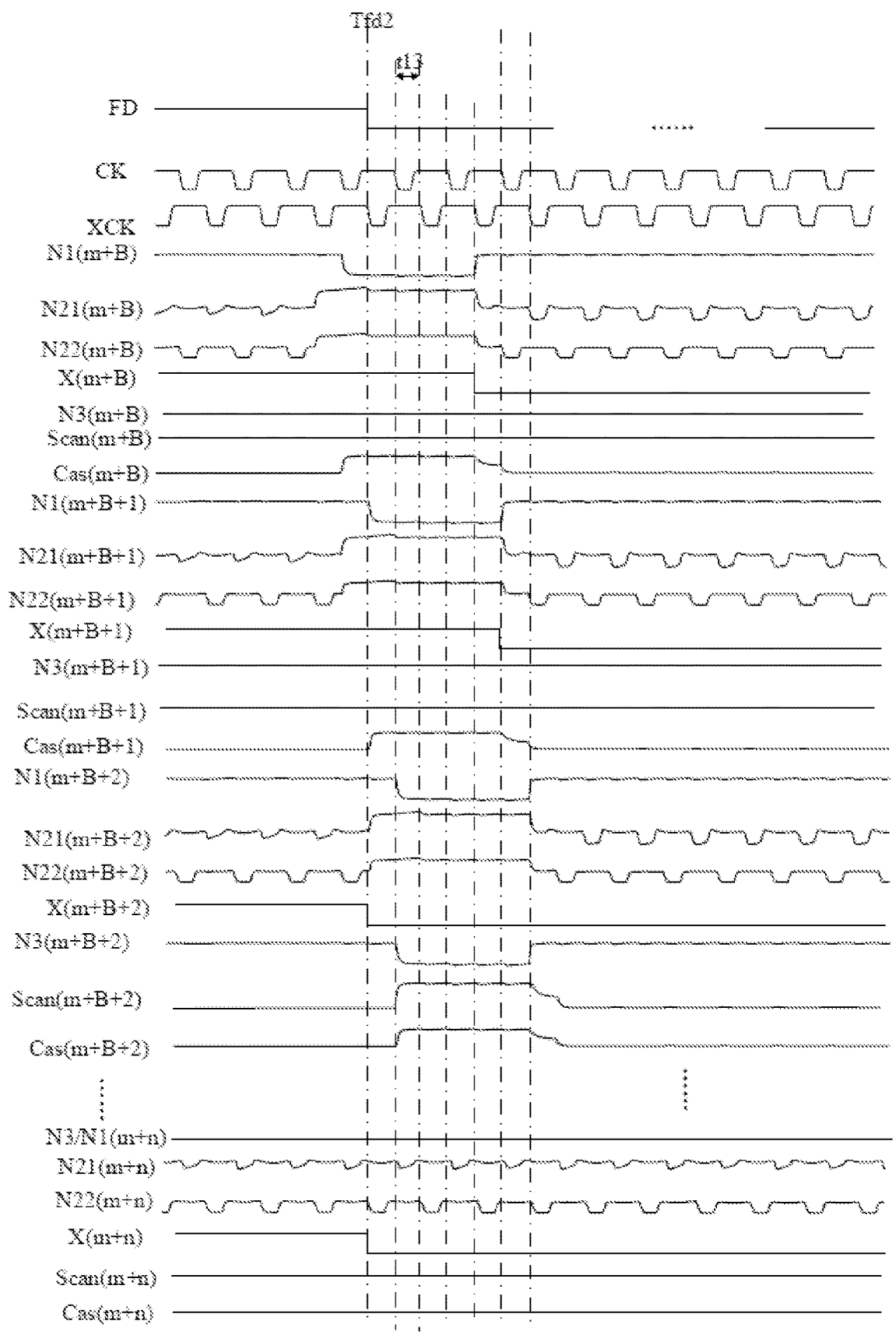

FIGS. 2B-2D are timing diagrams of a gate driving circuit according to an embodiment of the present application. Referring still to FIGS. 1B and 2B, an operation principle of the gate driving unit 10 is illustrated with reference to an example in which the (m+1)-th stage of gate driving circuit to the (m+n)-th stage of gate driving circuit of the gate driving unit 10 corresponding to the frequency division control signal FD have a transition between the low level and the high level, all of transistors included in each of the gate driving circuits are of the P-type, the transistor to which the gate control signal Scan is applied in the demand circuit is of the N-type, the second voltage is less than the first voltage, and the control terminals of the first shielding transistor Ta1 and the second shielding transistor Ta2 are always kept in an on state. Where, m≥1, and n≥1. N3/N1 (m+n) denotes the third node N3 and the first node N1 of the (m+n)-th stage of gate driving circuit.

In a first phase t1: the frequency division control signal FD is at the low level, the first clock signal XCK is at the low level, the second clock signal CK is at the high level, and the upper-stage transmission signal (e.g., Cas(m)) received by the (m+1)-th stage of gate driving circuit is at the low level.

In the stage transmission module 11 of the (m+1)-th stage of gate driving circuit, the fourth transistor Tt4 is in an off state according to the second clock signal CK; the first transistor Tt1 and the sixth transistor Tt6 are turned on according to the first clock signal XCK, respectively, and the upper-stage stage transmission signal Cas(m) received by the (m+1)-th stage of gate driving circuit is transmitted to the second node N2 (that is, the first sub-node N21(m+1) and the second sub-node N22(m+1)), so that all of the second transistor Tt2, the fifth transistor Tt5, the eighth transistor Tt8, and the second stage transmission transistor Tto2 are turned on according to the upper-stage stage transmission signal Cas(m). The first transistor Tt1 and the second transistor Tt2 are turned on so that the third transistor Tt3 and the seventh transistor Tt7 are turned on according to the third voltage and the first clock signal XCK, and a second clock signal CK is transmitted via the third transistor Tt3 to a junction of an electrical connection between the third capacitor C3 and the input terminal of the fourth transistor Tt4 (i.e., the fourth node N4), and the fourth voltage having the high state is transmitted via the seventh transistor Tt7 to the output terminal of the seventh transistor Tt7 (i.e., the fifth node N5) to charge the fourth capacitor C4. The fifth transistor Tt5 is turned on so that the fourth voltage is transmitted to the first node N1(m+1), and the first stage transmission output transistor Tto1 is in the off state according to the fourth voltage. The eighth transistor Tt8 is turned on so that the second clock signal CK is transmitted to the fifth node N5. The second stage transmission output transistor Tto2 is turned on so that the third voltage having the low level state output from the third voltage terminal VGL is output to the stage transmission output terminal of the (m+1)-th stage of gate driving circuit via the second stage transmission output transistor Tto2, thereby controlling the stage transmission module 11 of the lower-stage of gate driving circuit so that the stage transmission signal output from the stage transmission output terminal of the lower-stage of gate driving circuit also has the low level.

In the frequency division control module 13 of the (m+1)-th stage of gate driving circuit, the upper-stage stage transmission signal Cas(m) is transmitted to the first sub-node N21(m+1) and the second sub-node N22(m+1) via the second shielding transistor Ta2, so that all of the first control transistor Tf1, the third control transistor Tf3, and the second output transistor Tso2 are turned on. The frequency division control signal FD is transmitted to the control terminal of the second control transistor Tf2 via the first control transistor Tf1 so that the second control transistor Tf2 is turned on according to the frequency division control signal FD, and an electrical connection between the first node N1(m+1) and the third node N3(m+1) is implemented based on the second control transistor Tf2 being turned on. The third control transistor Tf3 is turned on so that the first voltage having the high level state is transmitted to the third node N3(m+1), and the first output transistor Tso1 is in the off state under the action of the first voltage and the first node N1(m+1) signal. The second output transistor Tso2 is turned on so that the second voltage having the low level state output from the second voltage terminal is output to the signal output terminal of the (m+1)-th stage of gate driving circuit via the second output transistor Tso2.

Thus, in the first phase t1, all of the stage transmission signals Cas(m+1)-Cas(m+n) output from the stage transmission output terminals of the (m+1)-th stage of gate driving circuit to the (m+n)-th stage of gate driving circuit have invalid level states, and all of the gate control signals Scan(m+1)-Scan(m+n) output from the stage transmission output terminals of the (m+1)-th stage of gate driving circuit to the (m+n)-th stage of gate driving circuit have the invalid level states.

A parasitic capacitance may exist between the first clock signal line CKL1 and the first sub-node N21 due to the layout design of the gate driving circuit, so that a potential change of the first sub-node N21 is inconsistent with that of the second sub-node N22. Therefore, a potential of the first sub-node N21 and a potential of the second sub-node N22 may be consistent or inconsistent in an actual application.

In a second phase t2: the frequency division control signal FD is at the low level, the first clock signal XCK is at the high level, the second clock signal CK is at the low level, and the upper-stage stage transmission signal Cas(m) received by the (m+1)-th stage of gate driving circuit is at the low level.

In the stage transmission module 11 of the (m+1)-th stage of gate driving circuit, the first transistor Tt1 and the sixth transistor Tt6 are turned off according to the first clock signal XCK, and the fourth transistor Tt4 is turned on according to the second clock signal CK. The fourth capacitor C4 maintains all of the second transistor Tt2, the fifth transistor Tt5, the eighth transistor Tt8, and the second stage transmission output transistor Tto2 to be turned on. The second transistor Tt2 is turned on so that the third transistor Tt3 and the seventh transistor Tt7 are both turned off according to the second clock signal CK, which is transmitted via both the second transistor Tt2 and the second shielding transistor Ta2 to a junction of an electrical connection between the third capacitor C3 and the control terminal of the third transistor Tt3 (i.e., the sixth node N6), and the potential of the fourth node N4 is pulled up by coupling the fourth node N4 with the third capacitor C3. The fifth transistor Tt5 is turned on so that the fourth voltage is transmitted to the first node N1(m+1), and the first stage transmission output transistor Tto1 is in the off state according to the fourth voltage and the potential of the fourth node N4. The eighth transistor Tt8 is turned on so that the second clock signal CK is transmitted to the fifth node N5, and the fifth node N5 is coupled with the fourth capacitor C4 so that the potential of the second sub-node N22(m+1) is further pulled down, and the second stage transmission output transistor Tto2 remains to be turned on so that the second voltage having the low level state output from the second voltage terminal is output to the stage transmission output terminal of the (m+1)-th stage of gate driving circuit via the second stage transmission output transistor Tto2, thereby controlling the stage transmission module 11 of the lower-stage of gate driving circuit so that the stage transmission signal output from the stage transmission output terminal of the lower-stage of gate driving circuit also has the invalid level state.

In the frequency division control module 13 of the (m+1)-th stage of gate driving circuit, all of the first control transistor Tf1, the third control transistor Tf3, and the second output transistor Tso2 are turned on because the potentials of the first sub-node N21(m+1) and the second sub-node N22(m+1) are in a low-potential state due to the influence of the fourth capacitor C4. The frequency division control signal FD is transmitted to the control terminal of the second control transistor Tf2 via the first control transistor Tf1 so that the second control transistor Tf2 is turned on, and an electrical connection between the first node N1(m+1) and the third node N3(m+1) is implemented. The third control transistor Tf3 is turned on so that the first voltage is transmitted to the third node N3(m+1), and the first output transistor Tso1 is in the off state under the action of the first voltage and the first node N1(m+1) signal. The second output transistor Tso2 is turned on so that the second voltage is output to the signal output terminal of the (m+1)-th stage of gate driving circuit.

Thus, in the second phase t2, all of the stage transmission signals Cas(m+1)-Cas(m+n) output from the stage transmission output terminals of the (m+1)-th stage of gate driving circuit to the (m+n)-th stage of gate driving circuit have invalid level states, and all of the gate control signals Scan(m+1)-Scan(m+n) output from the stage transmission output terminals of the (m+1)-th stage of gate driving circuit to the (m+n)-th stage of gate driving circuit have the invalid level states.

In a third phase t3: the frequency division control signal FD is at the low level, the first clock signal XCK is at the low level, the second clock signal CK is at the high level, and the upper-stage stage transmission signal Cas(m) received by the (m+1)-th stage of gate driving circuit is at the high level.

In the stage transmission module 11 of the (m+1)-th stage of gate driving circuit, the fourth transistor Tt4 is in the off state according to the second clock signal CK; the first transistor Tt1 and the sixth transistor Tt6 are turned on according to the first clock signal XCK, and the upper-stage stage transmission signal Cas(m) received by the (m+1)-th stage of gate driving circuit is transmitted to the second node N2, so that all of the second transistor Tt2, the fifth transistor Tt5, the eighth transistor Tt8, and the second stage transmission transistor Tto2 are turned off according to the upper-stage stage transmission signal Cas(m). The first transistor Tt1 is turned on so that the third transistor Tt3 and the seventh transistor Tt7 are both turned on according to the third voltage, and the second clock signal CK is transmitted via the third transistor Tt3 to the fourth node N4, and the fourth voltage is transmitted via the seventh transistor Tt7 to the fifth node N5 to charge the fourth capacitor C4. The fifth capacitor C5 maintains the first stage transmission output transistor Tto1 to be in the off state, and the stage transmission signal Cas(m+1) output from the stage transmission output terminal remains in the invalid level state, so that the stage transmission signal output from the stage transmission output terminal of the lower-stage of gate driving circuit also has the invalid level state.

In the frequency division control module 13 of the (m+1)-th stage of gate driving circuit, the upper-stage stage transmission signal Cas(m) is transmitted to the first sub-node N21(m+1) and the second sub-node N22(m+1) via the second shielding transistor Ta2, so that all of the first control transistor Tf1, the third control transistor Tf3, and the second output transistor Tso2 are turned off, the potential of the control terminal of the second control transistor Tf2 remains to be the same as that in the second stage t2, the first node N1(m+1) is electrically connected to the third node N3(m+1), the first capacitor C1 maintains the first output transistor Tso1 to be in the off state, and the gate control signal Scan(m+1) output from the signal output terminal of the (m+1)-th stage of gate driving circuit remains in the invalid level state.

Thus, in the third phase t3, all of the stage transmission signals Cas(m+1)-Cas(m+n) output from the stage transmission output terminals of the (m+1)-th stage of gate driving circuit to the (m+n)-th stage of gate driving circuit have invalid level states, and all of the gate control signals Scan(m+1)-Scan(m+n) output from the stage transmission output terminals of the (m+1)-th stage of gate driving circuit to the (m+n)-th stage of gate driving circuit have the invalid level states.

In a fourth phase t4: the frequency division control signal FD is at the low level, the first clock signal XCK is at the high level, the second clock signal CK is at the low level, and the upper-stage stage transmission signal Cas(m) received by the (m+1)-th stage of gate driving circuit is at the high level.

In the stage transmission module 11 of the (m+1)-th stage of gate driving circuit, the first transistor Tt1 and the sixth transistor Tt6 are turned off according to the first clock signal XCK, and the fourth transistor Tt4 is turned on according to the second clock signal CK. The fourth capacitor C4 maintains all of the second transistor Tt2, the fifth transistor Tt5, the eighth transistor Tt8, and the second stage transmission output transistor Tto2 to be turned off. The third capacitor C3 maintains the third transistor Tt3 to be turned on, so that the second clock signal CK is transmitted to the fourth node N4 via the third transistor Tt3, and the potential of the sixth node N6 is further pulled down by coupling the third capacitor C3 with the sixth node N6, so that the seventh transistor Tt7 is turned on, and the fourth voltage is coupled via the fourth capacitor C4 so that the potential of the second node N2 is further pulled up. The fourth node N4 and the first node N1 are electrically connected based on the fourth transistor Tt4 being turned on, so that the first stage transmission output transistor Tto1 is turned on, and the first voltage is transmitted via the first stage transmission output transistor Tto1 to the stage transmission output terminal of the (m+1)-th stage of gate driving circuit, so that the stage transmission signal Cas(m+1) output from the stage transmission output terminal of the (m+1)-th stage of gate driving circuit has a valid level state.

Correspondingly, an example in which a plurality of gate driving circuits are cascaded row by row is taken. An (m+2)-th stage of gate driving circuit receives a stage transmission signal Cas(m+1) output from an (m+1)-th stage of gate driving circuit, and the fourth phase t4 corresponding to the (m+2)-th stage of gate driving circuit has the same operation as the third phase t3 corresponding to the (m+1)-th stage of gate driving circuit. That is, the stage transmission signal Cas(m+2) output in the fourth phase t4 corresponding to the (m+2)-th stage of gate driving circuit has the invalid level state, and the gate control signal Scan(m+2) output in the fourth phase t4 corresponding to the (m+2)-th stage of gate driving circuit has the invalid level state. It should be understood that the plurality of gate driving circuits may also be arranged in a manner of an interlaced cascade connection. For example, the lower-stage of gate driving circuit receiving the stage transmission signal Cas(m+1) output from the (m+1)-th stage of gate driving circuit is the (m+3)-th stage of gate driving circuit. Correspondingly, the fourth phase t4 corresponding to the (m+3)-th stage of gate driving circuit has the same operation as the third phase t3 corresponding to the (m+1)-th stage of gate driving circuit.

In the frequency division control module 13 of the (m+1)-th stage of gate driving circuit, all of the first control transistor Tf1, the third control transistor Tf3, and the second output transistor Tso2 are turned off because the potentials of the first sub-node N21(m+1) and the second sub-node N22(m+1) are at the high level state due to the influence of the fourth capacitor C4. The second control transistor Tf2 remains in the on state, so that the first node N1(m+1) is electrically connected to the third node N3(m+1), the first output transistor Tso1 is turned on, and the gate control signal Scan(m+1) output from the signal output terminal of the (m+1)-th stage of gate driving circuit has the valid level state.

Thus, in the fourth phase t4, the stage transmission signal Cas(m+1) output from the (m+1)-th stage of gate driving circuit has the valid level state, the gate control signal Scan(m+1) output from the (m+1)-th stage of gate driving circuit has the valid level state, all of the stage transmission signals Cas(m+2)-Cas(m+n) output from the stage transmission output terminals of the (m+2)-th stage of gate driving circuit to the (m+n)-th stage of gate driving circuit have the invalid level states, and all of the gate control signals Scan(m+2)-Scan(m+n) output from the stage transmission output terminals of the (m+2)-th stage of gate driving circuit to the (m+n)-th stage of gate driving circuit have the invalid level states.

In a fifth phase t5: the frequency division control signal FD is at the low level, the first clock signal XCK is at the low level, the second clock signal CK is at the high level, and the upper-stage stage transmission signal Cas(m) received by the (m+1)-th stage of gate driving circuit is at the high level.

In the stage transmission module 11 of the (m+1)-th stage of gate driving circuit, the fourth transistor Tt4 is in the off state according to the second clock signal CK; the first transistor Tt1 and the sixth transistor Tt6 are turned on according to the first clock signal XCK, and the upper-stage stage transmission signal Cas(m) received by the (m+1)-th stage of gate driving circuit is transmitted to the second node N2, so that all of the second transistor Tt2, the fifth transistor Tt5, the eighth transistor Tt8, and the second stage transmission transistor Tto2 are turned off according to the upper-stage stage transmission signal Cas(m). The first transistor Tt1 is turned on so that the third transistor Tt3 and the seventh transistor Tt7 are both turned on according to the third voltage, and the second clock signal CK is transmitted via the third transistor Tt3 to the fourth node, and the fourth voltage is transmitted via the seventh transistor Tt7 to the fifth node N5 to charge the fourth capacitor C4. The fifth capacitor C5 maintains the first stage transmission output transistor Tto1 to be in the on state, and the stage transmission signal Cas(m+1) output from the stage transmission output terminal remains in the valid level state.

Correspondingly, an example in which a plurality of gate driving circuits are cascaded row by row is taken. An (m+2)-th stage of gate driving circuit receives a stage transmission signal Cas(m+1) output from an (m+1)-th stage of gate driving circuit, and the fifth phase t5 corresponding to the (m+2)-th stage of gate driving circuit has the same operation as the fourth phase t4 corresponding to the (m+1)-th stage of gate driving circuit. An (m+3)-th stage of gate driving circuit receives a stage transmission signal Cas(m+2) output from an (m+2)-th stage of gate driving circuit, and the fifth phase t5 corresponding to the (m+3)-th stage of gate driving circuit has the same operation as the fourth phase t4 corresponding to the (m+2)-th stage of gate driving circuit. That is, the stage transmission signal Cas(m+2) output in the fifth phase t5 corresponding to the (m+2)-th stage of gate driving circuit has the valid level state, and the gate control signal Scan(m+2) output in the fifth phase t5 corresponding to the (m+2)-th stage of gate driving circuit has the valid level state. The stage transmission signal Cas(m+3) output in the fifth phase t5 corresponding to the (m+3)-th stage of gate driving circuit has the invalid level state, and the gate control signal Scan(m+3) output in the fifth phase t5 corresponding to the (m+3)-th stage of gate driving circuit has the invalid level state. It should be understood that the plurality of gate driving circuits may also be arranged in a manner of an interlaced cascade connection. For example, the lower-stage of gate driving circuit receiving the stage transmission signal Cas(m+1) output from the (m+1)-th stage of gate driving circuit is the (m+3)-th stage of gate driving circuit, and the lower-stage of gate driving circuit receiving the stage transmission signal Cas(m+3) output from the (m+3)-th stage of gate driving circuit is the (m+5)-th stage of gate driving circuit. Correspondingly, the fifth phase t5 corresponding to the (m+3)-th stage of gate driving circuit has the same operation as the fourth phase t4 corresponding to the (m+1)-th stage of gate driving circuit, and the fifth phase t5 corresponding to the (m+5)-th stage of gate driving circuit has the same operation as the fourth phase t4 corresponding to the (m+3)-th stage of gate driving circuit.

In the frequency division control module 13 of the (m+1)-th stage of gate driving circuit, the upper-stage stage transmission signal Cas(m) is transmitted to the first sub-node N21(m+1) and the second sub-node N22(m+1) via the second shielding transistor Ta2, so that all of the first control transistor Tf1, the third control transistor Tf3, and the second output transistor Tso2 are turned off, the second control transistor Tf2 remains in the on state, the first node N1(m+1) is electrically connected to the third node N3(m+1), the first output transistor Tso1 remains in the on state, and the gate control signal Scan(m+1) output from the signal output terminal of the (m+1)-th stage of gate driving circuit remains in the valid level state.

Thus, in the fifth phase t5, the example in which the plurality of gate driving circuits are cascaded row by row is taken. Both of the stage transmission signals Cas(m+1)-Cas(m+2) output from the stage transmission output terminals of the (m+1)-th stage of gate driving circuit to the (m+2)-th stage of gate driving circuit have the valid level states, both of the gate control signals Scan(m+1)-Scan(m+2) output from the stage transmission output terminals of the (m+1)-th stage of gate driving circuit to the (m+2)-th stage of gate driving circuit have the invalid level states, all of the stage transmission signals Cas(m+3)-Cas(m+n) output from the stage transmission output terminals of the (m+3)-th stage of gate driving circuit to the (m+n)-th stage of gate driving circuit have the invalid level states, and all of the gate control signals Scan(m+3)-Scan(m+n) output from the stage transmission output terminals of the (m+3)-th stage of gate driving circuit to the (m+n)-th stage of gate driving circuit have the invalid level states. Alternatively, the plurality of gate driving circuits may also be arranged in the manner of the interlaced cascade connection. In the fifth phase t5, both of the stage transmission signals Cas(m+1) and Cas(m+3) output from the stage transmission output terminals of the (m+1)-th stage of gate driving circuit and the (m+3)-th stage of gate driving circuit have the valid level states, both of the gate control signals Scan(m+1)-Scan(m+3) output from the stage transmission output terminals of the (m+1)-th stage of gate driving circuit and the (m+3)-th stage of gate driving circuit have valid pulses, all of the stage transmission signals Cas(m+5)-Cas(m+n) output from the stage transmission output terminals of the (m+5)-th stage of gate driving circuit to the (m+n)-th stage of gate driving circuit have the invalid level states, and all of the gate control signals Scan(m+5)-Scan(m+n) output from the stage transmission output terminals of the (m+5)-th stage of gate driving circuit to the (m+n)-th stage of gate driving circuit have the invalid level states.

In a sixth phase t6: the frequency division control signal FD is at the low level, the first clock signal XCK is at the high level, the second clock signal CK is at the low level, and the upper-stage stage transmission signal Cas(m) received by the (m+1)-th stage of gate driving circuit is at the low level.

The sixth phase t6 corresponding of the stage transmission module 11 and the frequency division control module 13 of the (m+1)-th stage of gate driving circuit has the same operation as the fourth stage t4 corresponding to the stage transmission module 11 and the frequency division control module 13 of the (m+1)-th stage of gate driving circuit. An example in which a plurality of gate driving circuits are cascaded row by row is taken. The sixth phase t6 corresponding to the (m+2)-th stage of gate driving circuit has the same operation as the fifth phase t5 corresponding to the (m+1)-th stage of gate driving circuit, the sixth phase t6 corresponding to the (m+3)-th stage of gate driving circuit has the same operation as the fifth phase t5 corresponding to the (m+2)-th stage of gate driving circuit, and so on. An operation included in the respective sixth phase t6 corresponding to each of the (m+3)-th stage of gate driving circuit to the (m+n)-th stage of gate driving circuit can be obtained. Similarly, when the plurality of gate driving circuits may also be arranged in the manner of the interlaced cascade connection, an operation included in the respective sixth phase t6 corresponding to each of the plurality of gate driving circuits can be obtained.

The first clock signal XCK and the second clock signal CK may have a plurality of high-low level switches, respectively, between the fifth stage t5 and the sixth stage t6, so that the valid pulses of the stage transmission signal Cas and the gate control signal Scan output from the gate driving circuit have a larger pulse width to meet the use requirement.

In a seventh phase t7: the frequency division control signal FD is at the low level, the first clock signal XCK is at the low level, the second clock signal CK is at the high level, and the upper-stage stage transmission signal Cas(m) received by the (m+1)-th stage of gate driving circuit is at the low level.

In the stage transmission module 11 of the (m+1)-th stage of gate driving circuit, the fourth transistor Tt4 is turn off, the first transistor Tt1 and the sixth transistor Tt6 are turned on, and the upper-stage stage transmission signal Cas(m) received by the (m+1)-th stage of gate driving circuit is transmitted to the second node N2. However, since the second node N2 is electrically connected to the fourth capacitor C4, the potential of the second node N2 is changed from a high potential in the sixth stage t6 to a low potential in the seventh stage t7. The potential of the second node N2 is affected by a charging rate of the fourth capacitor C4, so that the potential of the second node N2 cannot reach a state in which the second stage transmission output transistor Tto2 is completely turned on, and thus the second stage transmission output transistor Tto2 is partially turned on. All of the second transistor Tt2, the fifth transistor Tt5, and the eighth transistor Tt8 are turned on according to the signal from the second node N2, both the first transistor Tt1 and the second transistor Tt2 are turned on so that both the third transistor Tt3 and the seventh transistor Tt7 are turned on according to the third voltage and the first clock signal XCK, the second clock signal CK is transmitted to the fourth node N4 via the third transistor Tt3, and the fourth voltage having a high level state is transmitted to the fifth node N5 via the seventh transistor Tt7. The fifth transistor Tt5 is turned on so that the fourth voltage is transmitted to the first node N1(m+1), and the first stage transmission output transistor Tto1 is in the off state according to the fourth voltage. The eighth transistor Tt8 is turned on so that the second clock signal CK is transmitted to the fifth node N5. The second stage transmission output transistor Tto2 is turned on so that the third voltage having the low level state output from the third voltage terminal VGL is output to the stage transmission output terminal of the (m+1)-th stage of gate driving circuit. The stage transmission signal Cas(m+1) output from the (m+1)-th stage of gate driving circuit has a charge delay phenomenon due to the charge rate of the fourth capacitor C4.

In the frequency division control module 13 of the (m+1)-th stage of gate driving circuit, the upper-stage stage transmission signal Cas(m) is transmitted to the first sub-node N21(m+1) and the second sub-node N22(m+1) via the second shielding transistor Ta2, and the second output transistor Tso2 is not completely turned on due to the charging rate of the fourth capacitor C4. Both the first control transistor Tf1 and the third control transistor Tf3 are turned on, so that the second control transistor Tf2 is turned on according to the frequency division control signal FD, and an electrical connection between the first node N1(m+1) and the third node N3(m+1) is implemented based on the second control transistor Tf2 being turned on. The third control transistor Tf3 is turned on so that the first voltage having the high level state is transmitted to the third node N3(m+1), and the first output transistor Tso1 is in the off state under the action of the first voltage and the first node N1(m+1) signal. The second output transistor Tso2 is turned on so that the second voltage having the low level state output from the second voltage terminal is output to the signal output terminal of the (m+1)-th stage of gate driving circuit via the second output transistor Tso2. The gate control signal Scan(m+1) output from the (m+1)-th stage of gate driving circuit also has the charge delay phenomenon due to the charge rate of the fourth capacitor C4.

Correspondingly, the seventh phase t7 corresponding to the lower-stage of gate driving circuit receiving the stage transmission signal Cas(m+1) output from the (m+1)-th stage of gate driving circuit has the same operation as the sixth phase t6 corresponding to the (m+1)-th stage of gate driving circuit, and so on. An operation included in the respective seventh phase t7 corresponding to each of the plurality of gate driving circuits can be obtained.

Therefore, in the seventh phase t7, the stage transmission signal Cas(m+1) output from the (m+1)-th stage of gate driving circuit has the invalid level state, and the gate control signal Scan(m+1) output from the (m+1)-th stage of gate driving circuit has the invalid level state.

A plurality of stages of gate driving circuits located after the (m+1)-th stage of gate driving circuit implement output of the stage transmission signal Cas and the gate control signal Scan according to the same operation manner as the first phase t1—the seventh phase t7 corresponding to the (m+1)-th stage of gate driving circuit. The frequency division control signal FD transitions from the low level to the high level until a first frequency division moment Tfd1.

Referring still to FIGS. 1B and 2C, in an eighth stage t8 after the seventh stage t7 and before the first frequency division moment Tfd1, the frequency division control signal FD is at the low level.

The third phase t3 corresponding to the (m+A)-th stage of gate driving circuit has the same operation as the third phase t3 corresponding to the (m+1)-th stage of gate driving circuit, the second phase t2 corresponding to the (m+(A+1))-th stage of gate driving circuit has the same operation as the second phase t2 corresponding to the (m+1)-th stage of gate driving circuit, and the first phase t1 corresponding to the (m+(A+2))-th stage of gate driving circuit has the same operation as the first phase t1 corresponding to the (m+1)-th stage of gate driving circuit.

That is, in the eighth phase t8, the stage transmission signals Cas(m+1) to Cas(m+A−1) and the gate control signals Scan(m+1)-Scan(m+A−1) output from the (m+1)-th stage of gate driving circuit to the (m+A−1)-th stage of gate driving circuit have outputted the valid pulses, and the stage transmission signals Cas(m+A) to Cas(m+n) and the gate control signals Scan(m+A)-Scan(m+n) output from the (m+A)-th stage of gate driving circuit to the (m+n)-th stage of gate driving circuit have not yet outputted the valid pulses (That is, the stage transmission signals Cas(m+A) to Cas(m+n) and the gate control signals Scan(m+A)-Scan(m+n) output from the (m+A)-th stage of gate driving circuit to the (m+n)-th stage of gate driving circuit have the invalid level pulses). The outputted valid pulses include an outputting valid pulse state and an invalid pulse state after the valid pulse is outputted.

In a ninth stage t9 after the eighth stage t8 and before the first frequency division moment Tfd1, the frequency division control signal FD is at the low level.

The fourth phase t4 corresponding to the (m+A)-th stage of gate driving circuit has the same operation as the fourth phase t4 corresponding to the (m+1)-th stage of gate driving circuit, the third phase t3 corresponding to the (m+(A+1))-th stage of gate driving circuit has the same operation as the third phase t3 corresponding to the (m+1)-th stage of gate driving circuit, the second phase t2 corresponding to the (m+(A+2))-th stage of gate driving circuit has the same operation as the second phase t2 corresponding to the (m+1)-th stage of gate driving circuit, and the first phase t1 corresponding to the (m+(A+3))-th stage of gate driving circuit has the same operation as the first phase t1 corresponding to the (m+1)-th stage of gate driving circuit.

That is, in the ninth phase t9, the stage transmission signals Cas(m+1) to Cas(m+A−1) and gate control signals Scan output from the (m+1)-th stage of gate driving circuit to the (m+A−1)-th stage of gate driving circuit have outputted the valid pulses, the stage transmission signal Cas(m+A) and the gate control signal Scan(m+A) output from the (m+A)-th stage of gate driving circuit are outputting the valid pulses, and the stage transmission signals Cas(m+A+1) to Cas(m+n) and the gate control signals Scan(m+A+1)-Scan(m+n) output from the (m+A+1)-th stage of gate driving circuit to the (m+n)-th stage of gate driving circuit have not yet outputted the valid pulses.

At the first frequency division moment Tfd1, the frequency division control signal FD transitions from the low level to the high level, all of second nodes N21(m+A), N22(m+A), N21(m+A+1) and N22(m+A+1) of the (m+A)-th stage of gate driving circuit and the (m+(A+1))-th stage of gate driving circuit are in the high level state, and all of second nodes N21(m+A+2)-N21(m+n) and N22(m+A+2)-N22(m+n) of the (m+(A+2))-th stage of gate driving circuit to the (m+n)-th stage of gate driving circuit are in the low level state. Correspondingly, the first control transistors Tf1 of the (m+A)-th stage of gate driving circuit and the (m+(A+1))-th stage of gate driving circuit are turned off, and the control terminals (i.e., a point X in FIG. 1B) of the second control transistors Tf2 of the (m+A)-th stage of gate driving circuit and the (m+(A+1))-th stage of gate driving circuit remain in the same state as that of the ninth stage t9. That is, the control terminals X(m+A) and X(m+A+1) of the second control transistors Tf2 of the (m+A)-th stage of gate driving circuit and the (m+(A+1))-th stage of gate driving circuit remain in the low level state, so that the third nodes N3(m+A) and N3(m+A+1) are in the low level state. The second nodes N21(m+A+2) and N22(m+A+2) of the (m+(A+2))-th stage of gate driving circuit are in the low level state, so that all of the first control transistor Tf1, the third control transistor Tf3, and the second output transistor Tso2 of the (m+(A+2))-th stage of gate driving circuit are turned on, and the frequency division control signal FD is transmitted via the first control transistor Tf1 to the control terminal of the second control transistor Tf2, so that the control terminal X(m+A+2) of the second control transistor Tf2 is in the high level state, the second control transistor Tf2 is turned off, the first node N1 is disconnected from the third node N3, the first capacitor C1 maintains the first output transistor Tso1 to be in the off state, and the second output transistor Tso2 is turned on so that the second voltage is output to the signal output terminal of the (m+(A+2))-th stage of gate driving circuit.

In a tenth stage t10 after the first frequency division moment Tfd1, the frequency division control signal FD is at the high level.

The fifth phase t5 corresponding to the (m+A)-th stage of gate driving circuit has the same operation as the fifth phase t5 corresponding to the (m+1)-th stage of gate driving circuit, and the fourth phase t4 corresponding to the (m+(A+1))-th stage of gate driving circuit has the same operation as the fourth phase t4 corresponding to the (m+1)-th stage of gate driving circuit. However, in the (m+(A+2))-th stage of gate driving circuit, the third phase t3 corresponding to the stage transmission module 11 of the (m+(A+2))-th stage of gate driving circuit has the same operation as the third phase t3 corresponding to the (m+1)-th stage of gate driving circuit, and the third phase t3 corresponding to the frequency division control module 13 of the (m+(A+2))-th stage of gate driving circuit has a different operation than the third phase t3 corresponding to the (m+1)-th stage of gate driving circuit.

That is, in the tenth phase t10, the stage transmission signals Cas(m+1)-Cas(m+A) and the gate control signals Scan(m+1)-Scan(m+A) output from the (m+1)-th stage of gate driving circuit to the (m+A)-th stage of gate driving circuit have outputted the valid level states, the stage transmission signal Cas(m+A+1) and the gate control signal Scan(m+A+1) output from the (m+(A+1))-th stage of gate driving circuit are outputting the valid pulses, and the stage transmission signals Cas(m+A+2) to Cas(m+n) and the gate control signals Scan(m+A+2)-Scan(m+n) output from the (m+A+2)-th stage of gate driving circuit to the (m+n)-th stage of gate driving circuit have not yet outputted the valid pulses.

An example in which the plurality of gate driving circuits are cascaded row by row is taken still. In the frequency division control module 13 of the (m+(A+2))-th stage of gate driving circuit, the stage transmission signal Cas(m+A+2) is transmitted to the first sub-node N21(m+A+2) and the second sub-node N22(m+A+2) via the second shielding transistor Ta2, so that all of the first control transistor Tf1, the third control transistor Tf3, and the second output transistor Tso2 are turned off, the potential of the control terminal of the second control transistor Tf2 remains to be the same as that at the first frequency division moment Tfd1, the first node N1 remains to be disconnected from the third node N3, the first capacitor C1 maintains the first output transistor Tso1 to be in the off state, and the gate control signal Scan(m+A+2) output from the signal output terminal of the (m+A+2)-th stage of gate driving circuit remains in the invalid level state.

In an eleventh phase t11 after the tenth phase t10, the frequency division control signal FD is at the high level.

The stage transmission signals Cas(m+A)-Cas(m+A+1) and the gate control signals Scan(m+A)-Scan(m+A+1) output from the (m+A)-th stage of gate driving circuit to the (m+(A+1))-th stage of gate driving circuit in the eleventh stage t11 still remain in the valid level states.

In the (m+(A+2))-th stage of gate driving circuit, the fourth phase t4 corresponding to the stage transmission module 11 of the (m+(A+2))-th stage of gate driving circuit has the same operation as the fourth phase t4 corresponding to the (m+1)-th stage of gate driving circuit, and the tenth phase t10 corresponding to the frequency division control module 13 of the (m+(A+2))-th stage of gate driving circuit has the same operation as the tenth phase t10 corresponding to the (m+(A+2))-th stage of gate driving circuit. That is, the stage transmission signal Cas(m+(A+2))-th outputted from the (m+(A+2))-th stage of gate driving circuit in the eleventh phase t11 is outputting the valid pulse, and the gate control signal Scan(m+A+2) outputted from the (m+(A+2))-th stage of gate driving circuit in the eleventh phase t11 still has the invalid level state.

Until the stage transmission signal Cas(m+(A+1))-th outputted from the (m+(A+1))-th stage of gate driving circuit become at the low level, all of the first control transistor Tf1, the third control transistor Tf3, and the second output transistor Tso2 in the (m+(A+2))-th stage of gate driving circuit are turned on, the second control transistor Tf2 is turned off, and the second voltage is output to the signal output terminal of the (m+(A+2))-th stage of gate driving circuit, so that the third node N3(m+A+2) of the (m+(A+2)) stage of gate driving circuit remains in the high level state, and the gate control signal Scan output from the signal output terminal of the (m+(A+2))-th stage of gate driving circuit remains in the invalid level state, as shown in a twelfth phase t12 shown in FIG. 2C.

Similarly, an operation principle that a frequency division control signal FD corresponding to each of a plurality of stages of gate driving circuits located behind the (m+(A+2))-th stage of gate driving circuit remains in the high level state can be obtained.

Similar to the frequency division control signal FD transitioning from the low level to the high level at the first frequency division moment Tfd1, the frequency division control signal FD may transition from the high level to the low level at the second frequency division moment Tfd2.

Referring still to FIGS. 1B and 2D, at the second frequency division moment Tfd2, all of second nodes N21(m+B), N22(m+B), N21(m+B+1) and N22(m+B+1) of the (m+B)-th stage of gate driving circuit and the (m+(B+1))-th stage of gate driving circuit are in the high level state, and all of second nodes N21(m+B+2)-N21(m+n) and N22(m+B+2)-N22(m+n) of the (m+(B+2))-th stage of gate driving circuit to the (m+n)-th stage of gate driving circuit are in the low level state. The control terminals X(m+B) and X(m+B+1) of the second control transistors Tf2 of the (m+B)-th stage of gate driving circuit and the (m+(B+1))-th stage of gate driving circuit remain in the high level state, and the third nodes N3(m+B) and N3(m+B+1) are in the high level state. All of the first control transistor Tf1, the third control transistor Tf3, and the second output transistor Tso2 of the (m+(B+2))-th stage of gate driving circuit are turned on, and the frequency division control signal FD is transmitted via the first control transistor Tf1 to the control terminal of the second control transistor Tf2, the control terminal X(m+B+2) of the second control transistor Tf2 is in the low level state, the second control transistor Tf2 is turned on, the first node N1(m+B+2) is electrically connected to the third node N3(m+B+2), the first output capacitor Tso1 is in the off state, and the second output transistor Tso2 is turned on so that the second voltage is output to the signal output terminal of the (m+(B+2))-th stage of gate driving circuit.

In a thirteenth phase t13 after the second frequency division moment Tfd2, the frequency division control signal FD is at the low level, the first node N1(m+B+2) of the (m+(B+2))-th stage of gate driving circuit is at the low state, and the second nodes N21(m+B+2) and N22(m+B+2) are at the high state.

The stage transmission signal Cas(m+B+2) output from the stage transmission module 11 of the (m+(B+2))-th stage of gate driving circuit has the valid level state, the stage transmission signal Cas(m+B+1) output from the (m+(B+1))-th stage of gate driving circuit is transmitted to the first sub-node N21(m+B+2) and the second sub-node N22(m+B+2) via the second shielding transistor Ta2, so that all of the first control transistor Tf1, the third control transistor Tf3, and the second output transistor Tso2 of the (m+(B+2))-th stage of gate driving circuit are turned off, the second control transistor Tf2 is turned on, the first node N1(m+B+2) is electrically connected to the third node N3(m+B+2), and the gate control signal Scan(m+B+2) output from the signal output terminal of the (m+(B+2))-th stage of gate driving circuit is at the valid level state.

Until the stage transmission signal Cas(m+(B+1))-th outputted from the (m+(B+1))-th stage of gate driving circuit become at the low level, all of the first control transistor Tf1, the third control transistor Tf3, and the second output transistor Tso2 in the (m+(B+2))-th stage of gate driving circuit are turned on, the second control transistor Tf2 is turned off, and the second voltage is output to the signal output terminal of the (m+(B+2))-th stage of gate driving circuit, so that the gate control signal Scan(m+B+2) output from the signal output terminal of the (m+(B+2))-th stage of gate driving circuit is at the invalid level state.

Similarly, an operation principle that a frequency division control signal FD corresponding to each of a plurality of stages of gate driving circuits located behind the (m+(B+2))-th stage of gate driving circuit remains in the high level state can be obtained.

In the circuit shown in FIG. 1C, the second capacitor C2 may be used to maintain the potential of the control terminal of the second control transistor Tf2. In the circuit shown in FIGS. 1D-1E, the frequency division control signal FD is transmitted via the first stabilization transistor Tst1 and the second stabilization transistor Tst2 to the control terminal of the second control transistor Tf2 to stabilize the potential of the control terminal of the second control transistor Tf2.

It should be understood that the operation principle of the gate driving circuit corresponding to FIGS. 1C-1H may refer to the operation principle of the corresponding FIG to adapt an application scenario in which the transistor to which the gate control signal Scan is applied in the demand circuit is of the N-type or the P-type.

Figure 3A:
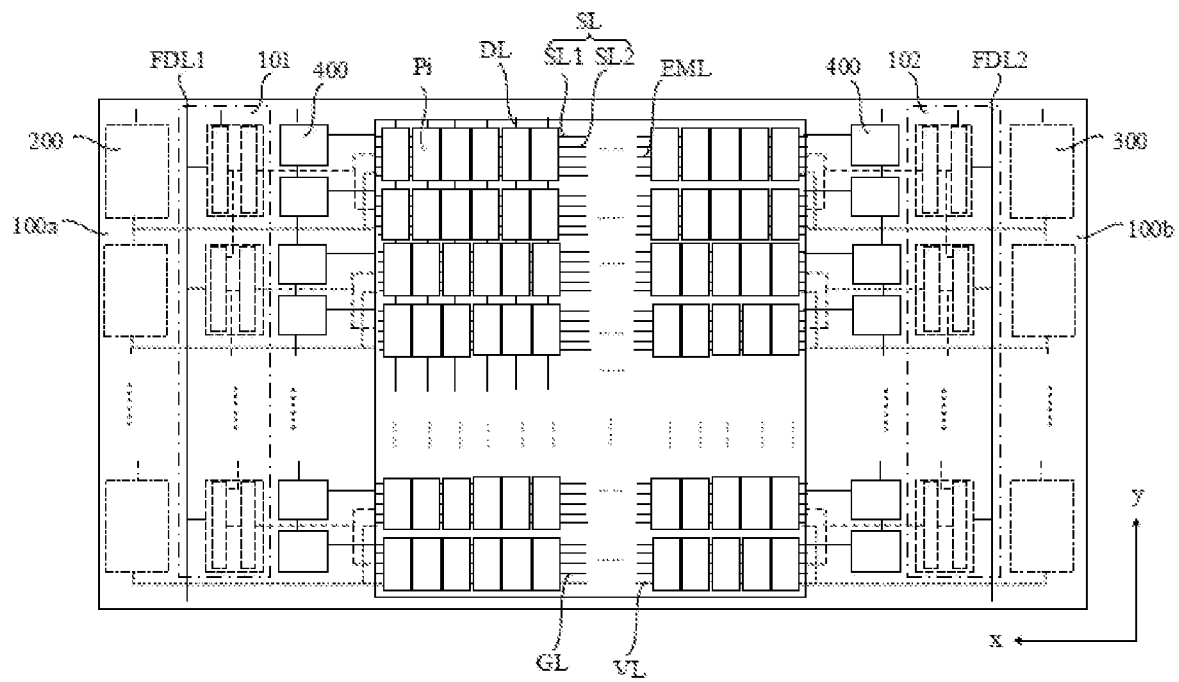
FIG. 3A-3B are schematic structural diagrams of a display device according to an embodiment of the present application.
Figure 3B:
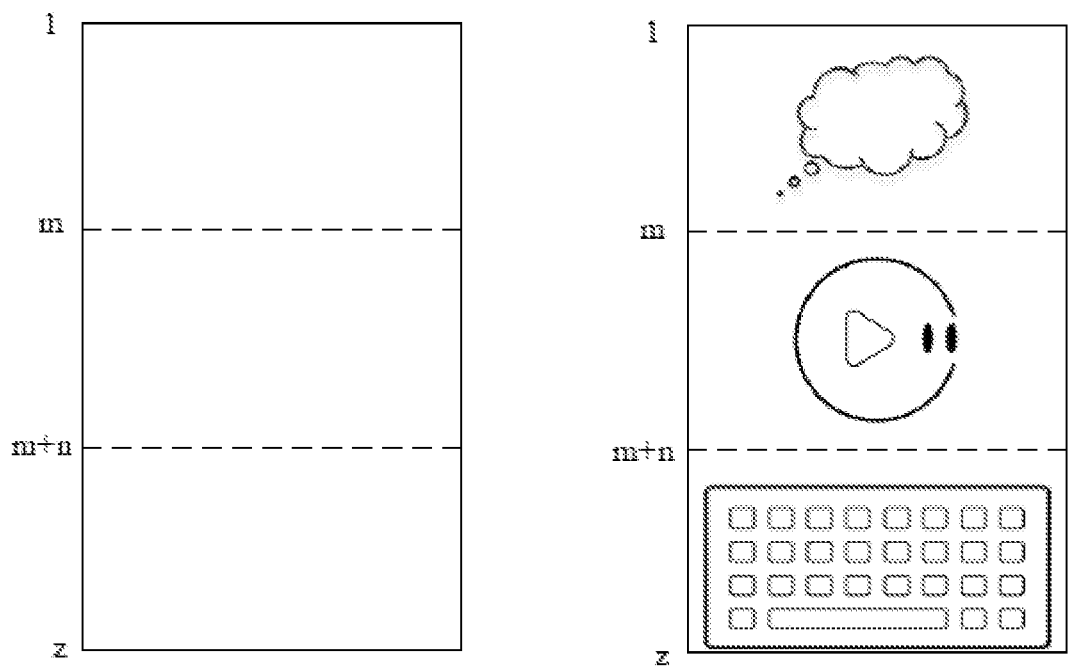
Figure 4:
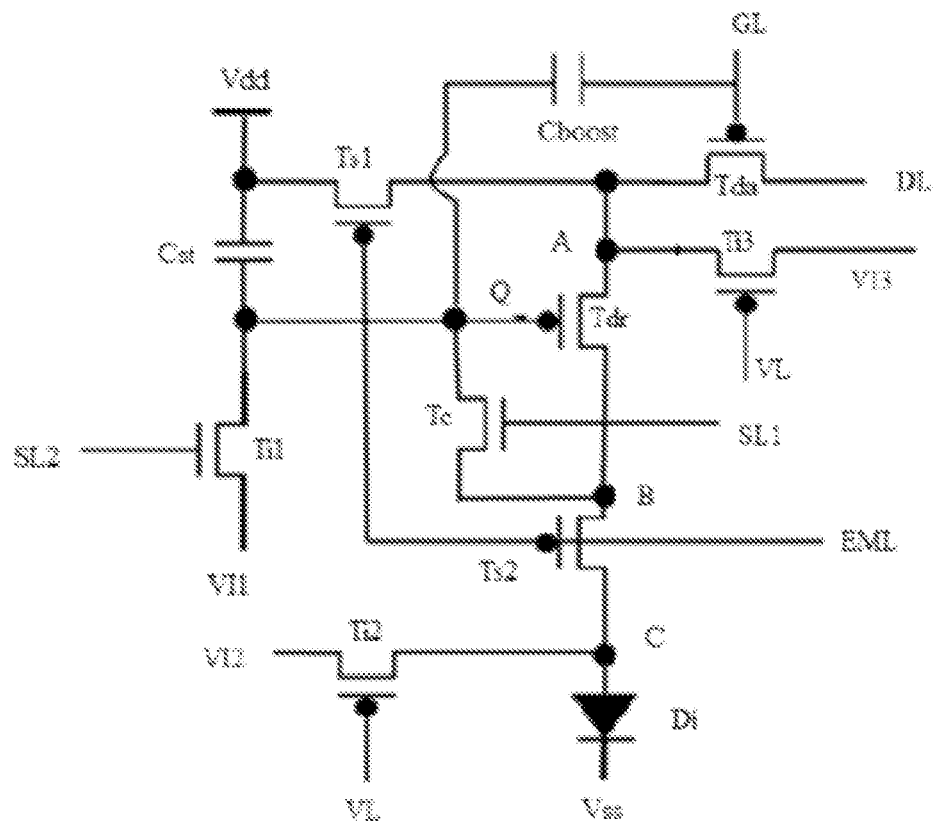
FIG. 4 is a schematic structural diagram of a pixel driving circuit according to an embodiment of the present application.
Figure 5A:
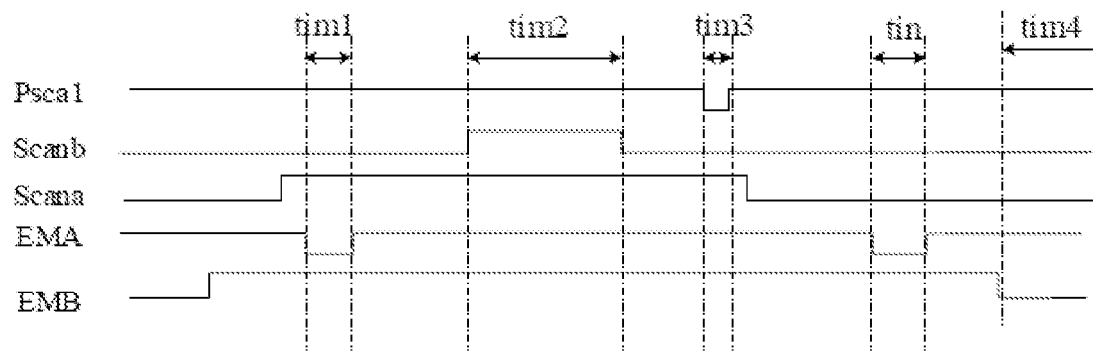
FIG. 5A-5B are timing diagrams of a display device according to an embodiment of the present application.
Figure 5B:
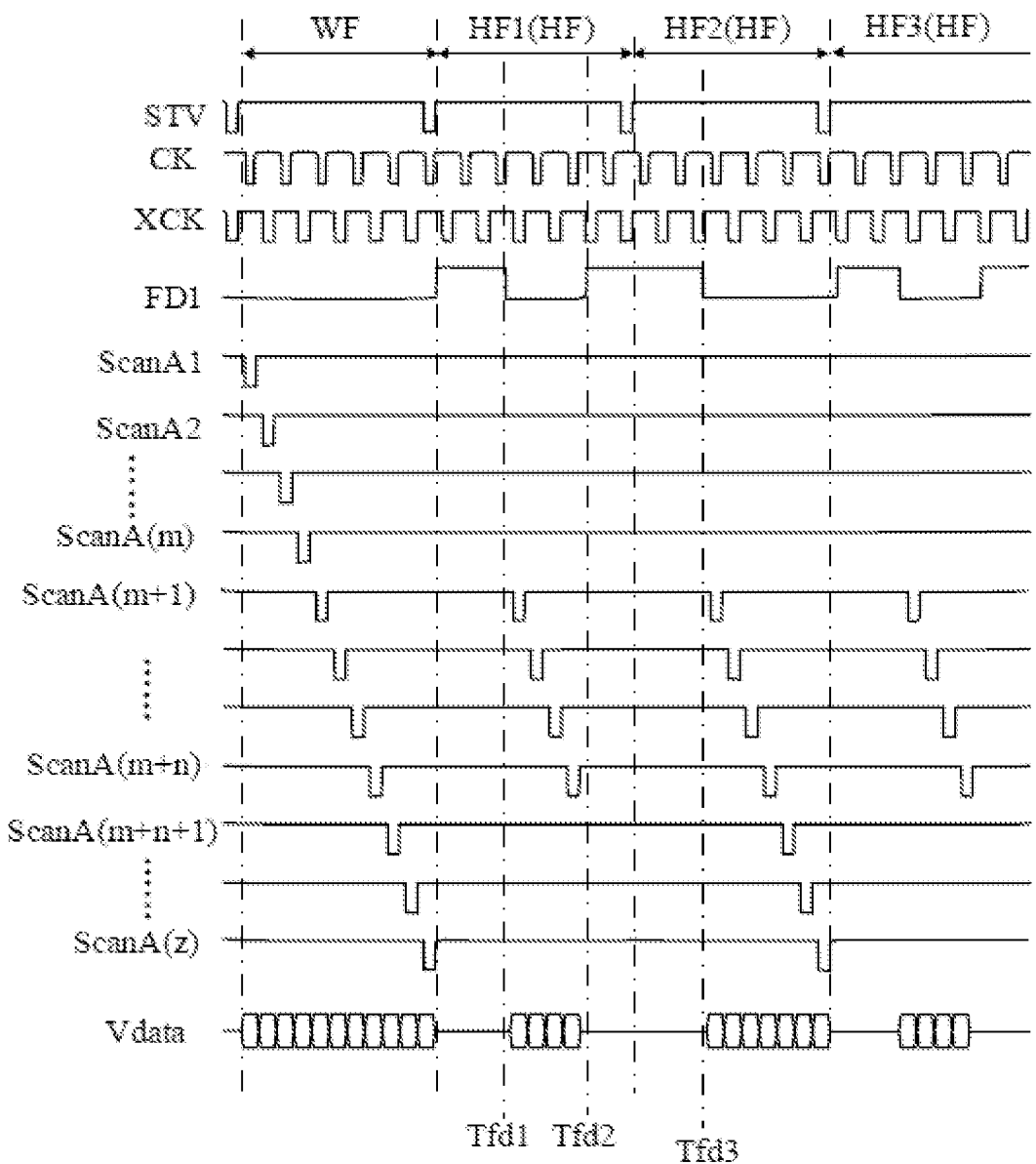

FIGS. 3A to 3B are schematic structural diagrams of a display device according to an embodiment of the present application. FIG. 4 is a schematic structural diagram of a pixel driving circuit according to an embodiment of the present application. FIGS. 5A-5B are timing diagrams corresponding to a display device according to an embodiment of the present application. The present application also provides a display device including a display panel and the gate driving unit 10 in any of the foregoings.

Alternatively, the display panel includes a plurality of sub-pixels Pi and a plurality of scanning lines SL, where each of the sub-pixels Pi includes a light emitting device Di and a pixel driving circuit for driving the light emitting device Di to emit light, and the pixel driving circuit includes at least one transistor. Gate control signals Scan output from the plurality of gate driving circuits are transmitted to control terminals of the transistors of the plurality of pixel driving circuits via the plurality of scanning lines SL, so that the display panel can control the plurality of sub-pixels Pi to realize frequency division display within a display period according to the gate control signals Scan.

Alternatively, in a writing frame WF of the display period, the frequency division control signal FD has a first level state, and the gate driving unit 10 correspondingly controls the gate control signals Scan to outputs valid pulses according to the first level state of the frequency division control signal FD, so that the display panel can implement update of a picture in the writing frame WF.

In a blanking interval after the writing frame WF or in at least one holding frame HF after the writing frame WF, the frequency division control signal FD has a transition from the first level state to the second level state so that the gate control unit controls the gate control signal Scan to not output the valid pulse according to the second level state of the frequency division control signal FD correspondingly.

Alternatively, the blanking interval includes a horizontal blanking interval and a vertical blanking interval. The first level state is one of the low level state and the high level state, and the second level state is the other of the low level state and the high level state.

Alternatively, within the at least one holding frame HF, the frequency division control signal FD has a transition between the first level state and the second level state. Alternatively, the number of switches between the first level state and the second level state within each of the holding frame HF may be the same or different.

When the frequency division control signal FD corresponds to the first level state, it is possible to correspondingly control gate control signals Scan generated by a portion of the gate driving circuits to output valid pulses. When the frequency division control signal FD corresponds to the second level state, it is possible to correspondingly control the gate control signals Scan generated by the portion of the gate driving circuits to not output the valid pulses. Therefore, by controlling a switching frequency of the frequency division control signal FD between the first level state and the second level state, it is possible to control the display panel to divide a display area into a plurality of sub-display areas having different frequencies. By controlling a switching moment of the frequency division control signal FD between the first level state and the second level state, it is possible to control the display panel to realize frequency division at any position in the display area.

Alternatively, the light emitting device Di includes an organic light emitting diode, a sub-millimeter light emitting diode, a micro light emitting diode, and the like.

Alternatively, the plurality of scanning lines SL are arranged in a second direction y, each of the scanning lines SL is extended in a first direction x intersecting the second direction y, and the plurality of scanning lines SL are configured to transmit the plurality of gate control signals Scan.

Referring still to FIG. 3A, the display panel includes a plurality of data lines DL and a plurality of light emitting control lines EML electrically connected to the plurality of sub-pixels Pi. The plurality of data lines DL are arranged in the first direction x, each of the data lines DL is extended in the second direction y, and the plurality of data lines DL are configured to transmit a plurality of data signals. The plurality of light-emitting control lines EML are arranged in the second direction y, each of the light-emitting control lines EML is extended in the first direction x, and the plurality of light-emitting control lines EML are configured to transmit a plurality of light emitting control signals.

Referring still to FIG. 4, the pixel driving circuit includes a driving transistor Tdr, a compensation transistor Tc, and a reset transistor Ti1.

The driving transistor Tdr and the light emitting device Di are connected in series between a first power supply line Vdd and a second power supply line Vss, and the driving transistor Tdr is configured to generate a driving current to drive the light emitting device Di to emit light according to a respective data signal Vdata transmitted by respective one of the data lines DL.

An input terminal and an output terminal of the compensation transistor Tc are electrically connected between a control terminal and an output terminal of the driving transistor Tdr, and the compensation transistor Tc is configured to enable the driving transistor Tdr to be connected in a form of a diode. Alternatively, the compensation transistor Tc includes an oxide transistor or a silicon transistor.

An input terminal and an output terminal of the reset transistor Ti1 are electrically connected between a first reset line and the control terminal of the driving transistor Tdr, and the reset transistor Ti1 is configured to enable the first reset signal VI1 transmitted via the first reset line to be transmitted to the control terminal of the driving transistor Tdr so as to reset the potential of the control terminal of the driving transistor Tdr. Alternatively, the compensation transistor Tc includes an oxide transistor or a silicon transistor.

Alternatively, each of scanning lines SL is electrically connected to the control terminal of the compensation transistor Tc or the reset transistor Ti1 of each of the plurality of sub-pixels Pi located in the same row.

Alternatively, the gate driving unit 10 includes one gate driving unit 10, where a plurality of cascaded gate driving circuits may be electrically connected to the control terminals of the reset transistors Ti1 of the plurality of sub-pixels Pi via the plurality of scanning lines SL, or the plurality of cascaded gate driving circuits are electrically connected to the control terminals of the compensation transistors Tc of the plurality of sub-pixels Pi via the plurality of scanning lines SL.

Alternatively, referring still to FIG. 3A, the gate driving unit 10 may include two gate driving units 10 (the two gate driving units 10 are denoted as a first gate driving unit 101 and a second gate driving unit 102, respectively, and the first gate driving unit 101 and the second gate driving unit 102 are not cascaded. Correspondingly, the frequency division control line FDL includes a first frequency division control line FDL1 electrically connected to the first gate driving unit 101 and a second frequency division control line FDL2 electrically connected to the second gate driving unit 102). The plurality of scanning lines SL include a plurality of first sub-scanning lines SL1 and a plurality of second sub-scanning lines SL2. The plurality of cascaded gate driving circuits included in the first gate driving unit 101 are electrically connected to the control terminals of the compensation transistors Tc of the plurality of sub-pixels Pi via the plurality of first sub-scanning lines SL1, and the plurality of cascaded gate driving circuits included in the second gate driving unit 102 are electrically connected to the control terminals of the reset transistors Ti1 of the plurality of sub-pixels Pi via the second sub-scanning lines SL2.

Alternatively, the display panel includes a display area and first and second non-display areas 100a and 100b located on opposite sides of the display area. The first gate driving unit 101 is located in the first non-display area 100a, and the second gate driving unit 102 is located in the second non-display area 100b, so as to facilitate a narrow frame design of the display panel.

Alternatively, referring still to FIG. 4, the pixel driving circuit of each of the sub-pixels Pi further includes a data transistor Tda, where the data transistor Tda includes an input terminal electrically connected to respective one of the data lines DL, and an output terminal electrically connected to the input terminal of the driving transistor Tdr.

Alternatively, the control terminal of the data transistor Tda of each of the plurality of sub-pixels Pi may be electrically connected to the gate driving unit 10 via one of the scanning lines SL. That is, the display panel may include a group of gate driving units 10 to connect the control terminals of the data transistors Tda of the plurality of sub-pixels Pi. The display panel may further include a plurality of groups of gate driving units 10. For example, the display panel may further include a third gate driving unit electrically connected to the third frequency division control line, and the third gate driving unit is electrically connected to the control terminal of the data transistor Tda of each of the plurality of sub-pixels Pi via the third scanning line of the plurality of scanning lines SL.

Alternatively, the control terminal of the data transistor Tda of each of the plurality of sub-pixels Pi may be electrically connected to one of the existing plurality of cascaded gate driving circuits via respective one of the gate control lines GL transmitting a data writing control signal.

Alternatively, the data transistor Tda includes a silicon transistor and an oxide transistor.

Alternatively, referring still to FIG. 4, the pixel driving circuit of each of the sub-pixels Pi further includes an initial transistor Ti2, where the initial transistor Ti2 includes an input terminal electrically connected to a second reset line and an output terminal electrically connected to the light emitting device Di, and the initial transistor Ti2 is configured to transmit the second reset signal VI2 transmitted via the second reset line to an anode of the light emitting device Di to initialize an anode potential of the light emitting device Di.

Alternatively, the pixel driving circuit of each of the sub-pixels Pi further includes a light emitting control transistor including a first light emitting control transistor Ts1 and a second light emitting control transistor Ts2, where an input terminal and an output terminal of the first light emitting control transistor Ts1 are electrically connected to the first power supply line Vdd and the input terminal of the driving transistor Tdr, an input terminal and an output terminal of the second light emitting control transistor Ts2 are electrically connected to the light emitting device Di and the output terminal of the driving transistor Tdr, control terminals of the first light emitting control transistor Ts1 and the second light emitting control transistor Ts2 are electrically connected to respective light emitting control lines EML, and the first light emitting control transistor Ts1 and the second light emitting control transistor Ts2 are configured to control a light emitting moment of the light emitting device Di according to the light emitting control signal transmitted via the light emitting control line EML.

Alternatively, the pixel driving circuit of each of the sub-pixels Pi further includes a sixth capacitor Cst connected in series between the first power supply line Vdd and the control terminal of the driving transistor Tdr.

Alternatively, the pixel driving circuit of each of the sub-pixels Pi further includes a seventh capacitor Cboost connected in series between the control terminal of the driving transistor Tdr and the control terminal of the data transistor Tda.

Alternatively, the pixel driving circuit of each of the sub-pixels Pi further includes a reset transistor Ti3, where the reset transistor Ti3 has an input terminal electrically connected to the third reset line and an output terminal electrically connected to the input terminal of the driving transistor Tdr, and the reset transistor Ti3 is configured to transmit the third reset signal VI3 transmitted via the third reset line to the input terminal of the driving transistor Tdr to reset the potential of the input terminal of the driving transistor Tdr.

Alternatively, the gate driving unit 10 included in the display panel may also be electrically connected to the control terminal of at least one of the initial transistor Ti2, the reset transistor Ti3, and the light emitting control transistor of each of the plurality of sub-pixels Pi.

Alternatively, the display panel includes a plurality of reset control lines VL, where each of the reset control lines VL is configured to transmit a reset control signal and electrically connected to control terminals of the initial transistor Ti2 and the reset transistor Ti3 of each of the plurality of sub-pixels Pi.

Alternatively, each of a plurality of cascaded gate driving circuits 200 electrically connected to control terminals of an initial transistor Ti2 and a reset transistor Ti3 of each of a plurality of sub-pixels Pi is located in the first non-display area 100a, each of a plurality of cascaded gate driving circuits 300 electrically connected to a control terminal of a light emitting control transistor of each of a plurality of sub-pixels Pi is located in the second non-display area 100b, and each of a plurality of cascaded gate driving circuits 400 electrically connected to a control terminal of a data transistor Tda of each of a plurality of sub-pixels Pi is located in the first non-display region 100a and the second non-display region 100b so as to reduce a frame of the non-display area of the display panel. Alternatively, each of the plurality of cascaded gate driving circuits 300 electrically connected to the control terminal of the light emitting control transistor of each of the plurality of sub-pixels Pi has the same circuit structure as each of the plurality of cascaded gate driving circuits 200 electrically connected to the control terminals of the initial transistors Ti2 and the reset transistors Ti3 of each of the plurality of sub-pixels Pi.

An example in which the control terminal of the reset transistor Ti1 is electrically connected to the first gate driving unit 101, the control terminal of the compensation transistor Tc is electrically connected to the second gate driving unit 102, and the reset transistor Ti1 and the compensation transistor Tc are N-type transistors is taken for purpose of illustrating an operation principle of the frequency division display of the display panel in the display period. The writing frame WF includes a first reset phase tim1, a second reset phase tim2, a data writing phase tim3, and a light emitting phase tim4.

In the writing frame WF, in order to enable the control terminals of the plurality of driving transistors Tdr included in the display panel to be reset and normally write data, the first frequency division signal FD1 transmitted via the first frequency division control line FDL1 electrically connected to the first gate driving unit 101 has the low level state, and the second frequency division signal transmitted via the second frequency division control line FDL2 electrically connected to the second gate driving unit 102 has the low level state, so that the first gate driving unit 101 can output a plurality of stages of first gate control signals Scana having the valid pulse in the writing frame WF, and the second gate driving unit 102 can output a plurality of stages of second gate control signals Scanb having the valid pulse in the writing frame WF. Thus, in the writing frame WF, each row of sub-pixels Pi are respectively subjected to the first reset phase tim1, the second reset phase tim2, the data writing phase tim3, and the light emitting phase tim4.

The operation principle of various phases of the writing frame WF will be illustrated by taking a row of a plurality of sub-pixels Pi as an example, as shown in FIG. 5A.

In the first reset phase tim1, the initial transistor Ti2 and the reset transistor Ti3 are turned on according to a corresponding reset control signal EMA, and the compensation transistor Tc is turned on according to a corresponding first gate control signal Scana, so that an anode of the light emitting device Di is reset according to a second reset signal VI2, and the input terminal, the output terminal and the control terminal of the driving transistor Tdr are reset according to a third reset signal VI3.

In the second reset phase tim2, the reset transistor Ti1 is turned on according to a corresponding second gate control signal Scanb, and the compensation transistor Tc is turned on according to a corresponding first gate control signal Scana, so that the output terminal and the control terminal of the driving transistor Tdr can be reset according to the second reset signal VI2.

In the data writing phase tim3, the data transistor Tda is turned on according to a corresponding data writing control signal Pscal, and the compensation transistor Tc is turned on according to the corresponding first gate control signal Scana, so that the control terminal of the driving transistor Tdr can write a data signal Vdata.

In the light emitting phase tim4, the first light emitting control transistor Ts1 and the second light emitting control transistor Ts1 are turned on according to a light emitting control signal EMB, so that the driving transistor Tdr generates a driving current to drive the corresponding light emitting device Di to emit light.

Optionally, a third reset phase tin is further included between the light emitting phase tim4 and the data writing phase tim3. In the third reset phase tin, the initial transistor Ti2 and the reset transistor Ti3 are turned on according to the corresponding reset control signal EMA, so that the anode of the light emitting device Di is reset according to the second reset signal VI2, and the input terminal and the output terminal of the driving transistor Tdr are reset according to the third reset signal VI3.

Referring still to FIG. 5B, taking a changing state of the first frequency division control signal FD1 as an example, the first frequency division control signal FD1 transitions from the low level state to the high level state in the vertical blanking interval, the first frequency division control signal FD1 transitions from the high level state to the low level state in the first frequency division moment Tfd1 of the first holding frame HF1, and the first frequency division control signal FD1 transitions from the low level state to the high level state in the second frequency division moment Tfd2 of the first holding frame HF1. Alternatively, the first frequency division moment Tfd1 and the second frequency division moment Tfd2 may correspond to the horizontal blanking interval. Alternatively, the second frequency division control signal may transition from the low level state to the high level state within the vertical blanking interval, and the second frequency division control signal may transition from the high level state to the low level state or from the low level state to the high level state within the first holding frame.

Before the first frequency division moment Tfd1 of the first holding frame HF1, a plurality of stages of first gate driving circuits corresponding to the first frequency division control signals FD1 having the high level state are denoted as an A1-th stage of gate driving circuit to an Am-th stage of gate driving circuit, and a plurality of stages of second gate driving circuits corresponding to the second frequency division control signals having the high level state are denoted as a B1-th stage of gate driving circuit to a Bm-th stage of gate driving circuit. After the first frequency division moment Tfd1 and before the second frequency division moment Tfd2 in the first holding frame HF1, a plurality of stages of first gate driving circuits corresponding to the first frequency division control signals FD1 having the low level state are denoted as an A(m+1)-th stage of gate driving circuit to an A(m+n)-th stage of gate driving circuit, and a plurality of stages of second gate driving circuits corresponding to the second frequency division control signals having the low level state are denoted as a B(m+1)-th stage of gate driving circuit to a B(m+n)-th stage of gate driving circuit. After the second frequency division moment Tfd2 of the first holding frame HF1, a plurality of stages of first gate driving circuits corresponding to the first frequency division control signals FD1 having the high level state are denoted as an A(m+n+1)-th stage of gate driving circuit to an Az-th stage of gate driving circuit, and a plurality of stages of second gate driving circuits corresponding to the second frequency division control signals having the high level state are denoted as a B(m+n+1)-th stage of gate driving circuit to a Bz-th stage of gate driving circuit. A plurality of sub-pixels Pi located in the first row to the m-th row of the display panel are electrically connected to the A1-th stage of gate driving circuit to the Am-th stage of gate driving circuit and the B1-th stage of gate driving circuit to the Bm-th stage of gate driving circuit, a plurality of sub-pixels Pi located in the (m+1)-th row to the (m+n) of the display panel are electrically connected to the A(m+1)-th stage of gate driving circuit to the A(m+n)-th stage of gate driving circuit and the B(m+1)-th stage of gate driving circuit to the B(m+n)-th stage of gate driving circuit, and a plurality of sub-pixels Pi located in the (m+n+1)-th row to the z-th row of the display panel are electrically connected to the A(m+n+1)-th stage of gate driving circuit to the Az-th stage of gate driving circuit and the B(m+n+1)-th stage of gate driving circuit to the Bz-th stage of gate driving circuit.

Then, in the first holding frame HF1, the first gate control signals ScanA1 to ScanAm generated by the A1-th stage of gate driving circuit to the Am-th stage of gate driving circuit do not output the valid pulse, the second gate control signals generated by the B1-th stage of gate driving circuit to the Bm-th stage of gate driving circuit do not output the valid pulse, the reset transistor Ti1 and the compensation transistor Tc of each of the plurality of sub-pixels Pi in the first row to the m-th row are turned off, and the plurality of sub-pixels Pi in the first row to the m-th row maintain the display screen in the writing frame WF. The first gate control signals ScanA(m+1) to ScanA(m+n) generated by the A(m+1)-th stage of gate driving circuit to the A(m+n)-th stage of gate driving circuit output the valid pulse, and the second gate control signals generated by the B(m+1)-th stage of gate driving circuit to the B(m+n)-th stage of gate driving circuit output the valid pulse. A plurality of sub-pixels Pi located in the (m+1)-th row to the (m+n)-th row undergo various stages of the writing frame WF in the first holding frame HF1, so that the plurality of sub-pixels Pi located in the (m+1)-th row to the (m+n)-th row display a picture different from the display picture of the writing frame WF in the first holding frame HF1. The first gate control signals ScanA(m+n+1) to ScanA(z) generated by the A(m+n+1) th stage of gate driving circuit to the Az-th stage of gate driving circuit do not output the valid pulse, the second gate control signals generated by the B(m+n+1) th stage of gate driving circuit to the Bz-th stage of gate driving circuit do not output the valid pulse, the reset transistor Ti1 and the compensation transistor Tc of each of the plurality of sub-pixels Pi of the (m+n+1)-th row to the z-th row are turned off in the first holding frame HF1, and the plurality of sub-pixels Pi located in the (m+n+1)-th row to the z-th row maintain the display screen of the writing frame WF in the first holding frame HF1.

Alternatively, the first frequency division control signal FD1 and the second frequency division can output the high level state after the second frequency division moment Tfd2 until the second holding frame HF2 after the first holding frame HF1. Alternatively, the first frequency division control signal FD1 and the second frequency division can output the high level state after the second frequency division moment Tfd2 until the vertical blanking interval.

An example in which the first frequency division control signal FD1 and the second frequency division can output the high level state after the second frequency division moment Tfd2 until the second holding frame HF2 after the first holding frame HF1 is taken, and in the second holding frame HF2, the first frequency division control signal FD1 transitions from the high level state to the low level state at the third frequency division moment Tfd3. Before the third frequency division moment Tfd3 of the second holding frame HF2, the plurality of stages of first gate driving circuits corresponding to the first frequency division control signals FD1 having the high level state are still denoted as the A1-th stage of gate driving circuit to the Am-th stage of gate driving circuit, and the plurality of stages of second gate driving circuits corresponding to the second frequency division control signals having the high level state are still denoted as the B1-th stage of gate driving circuit to the Bm-th stage of gate driving circuit. After the third frequency division moment Tfd3 of the second holding frame HF2, a plurality of stages of first gate driving circuits corresponding to the first frequency division control signals FD1 having the low level state are denoted as an A(m+1)-th stage of gate driving circuit to an Az-th stage of gate driving circuit, and a plurality of stages of second gate driving circuits corresponding to the second frequency division control signals having the low level state are denoted as a B(m+1)-th stage of gate driving circuit to a Bz-th stage of gate driving circuit.

Then, in the second holding frame HF2, the reset transistor Ti1 and the compensation transistor Tc of each of the plurality of sub-pixels Pi in the first row to the m-th row remain in the off state, and the plurality of sub-pixels Pi in the first row to the m-th row maintain the display screen in the writing frame WF. The first gate control signals ScanA (m+1) to ScanA(z) generated by the A(m+1)-th stage of gate driving circuit to the Az-th stage of gate driving circuit output the valid pulse, the second gate control signals generated by the B(m+1)-th stage of gate driving circuit to the Bz-th stage of gate driving circuit output the valid pulse. A plurality of sub-pixels Pi located in the (m+1)-th row to the z-th row undergo various stages of the writing frame WF in the second holding frame HF2, so that the plurality of sub-pixels Pi located in the (m+1)-th row to the z-th row display a picture different from the display picture of the writing frame WF in the second holding frame HF2.

Similarly, the operation principle of remaining hold frames HF in the display period can be obtained.

Thus, in the display period, the plurality of sub-pixels Pi in the first row to the m-th row may be used to implement display at a first frequency, the plurality of sub-pixels Pi of the (m+1)-th row to the (m+n)-th row may be used to implement display at a second frequency, and the plurality of sub-pixels Pi of the (m+n+1)-th row to the z-th row may be used to implement display at a third frequency.

Alternatively, the first frequency may be greater than, less than, or equal to the second frequency such that the first display area and the second display area may display pictures at different frequencies or the same frequency in the display period.

Alternatively, the third frequency may be equal to the first frequency or the second frequency. Alternatively, the third frequency may be different from both the first frequency and the second frequency.

Alternatively, the first frequency may be 1 Hz to 360 Hz, the second frequency may be 1 Hz to 360 Hz, and the third frequency may be 1 Hz to 360 Hz.

Alternatively, in the display period, both the first frequency and the third frequency may be both less than or both greater than the second frequency, and the first frequency is less than or greater than the third frequency. Alternatively, in the display period, the first frequency is less than the second frequency and the second frequency is less than the third frequency. Alternatively, in the display period, the first frequency is greater than the second frequency and the second frequency is greater than the third frequency. By setting the first frequency, the second frequency and the third frequency according to different relationships, different display requirements of the display panel can be realized in correspondingly different display periods.

For example, the plurality of sub-pixels Pi of the first row to the m-th row may be used to display a display picture (e.g., for continuously displaying power information, time information, certain signal status information (e.g., wifi information, flow information, Bluetooth information, and the like) with a relatively low refresh frequency, and also used to display bullet screen messages, and the like), and the plurality of sub-pixels Pi of the (m+1)-th row to the (m+n)-th row may be used to display a display screen (e.g., a movie screen, a game screen, and the like) with a relatively high refresh frequency. Alternatively, the plurality of sub-pixels Pi of the (m+n+1)-th to the z-th may be used to display a display screen (e.g., information used to implement an information inputting function (e.g., a keyboard, a handwriting box, or the like), a text box, a comment area, and the like) of a frequency different from that of the first display area and the second display area, as shown in FIG. 3B.

Where z may be less than or equal to the number of rows of the sub-pixels Pi included in the display panel. In addition, the (m+n) may be less than or equal to the number of rows of the sub-pixels Pi included in the display panel. That is, the number of sub-display areas having different display frequencies in the display panel is greater than or equal to 2. If (m+n) is equal to the number of rows of the sub-pixels Pi included in the display panel, the display panel includes two sub-display areas having different display frequencies. If z is equal to the number of rows of the sub-pixels Pi included in the display panel, the display panel includes three sub-display areas having different display frequencies. If z is less than the number of rows of sub-pixels Pi included in the display panel, the display panel includes at least four sub-display areas having different display frequencies. It should be understood that a plurality of sub-pixels Pi included in a row may be used as a sub-display area, and a plurality of sub-pixels Pi included in successive rows may also be used as a sub-display area.

It should be understood that the number of sub-display areas of the display panel in each of display periods may be different, and correspondingly frequency division positions may be also different, so that the display panel is applicable to different application scenarios.

By switching the frequency division control signal FD between the first level state and the second level in each of holding frames HF of the display period, the display panel can be controlled to realize frequency division display at any position in the display period.

A specific example is used herein to describe a principle and an implementation of the present application. The description of the foregoing embodiments is merely used to help understand a method and a core idea of the present application. In addition, a person skilled in the art may make changes in a specific implementation manner and an application scope according to an idea of the present application. In conclusion, content of this specification should not be construed as a limitation on the present application.

What is claimed is:

1. A gate driving unit, comprising a frequency division control line and a plurality of cascaded gate driving circuits, wherein the frequency division control line transmits a frequency division control signal to the plurality of cascaded gate driving circuits, and each of the gate driving circuits comprises:

a stage transmission module receiving an upper-stage stage transmission signal and outputting a current-stage stage transmission signal to a lower-stage of gate driving circuit;

an output module electrically connected to a first node and a second node in the stage transmission module and outputting a gate control signal based on the frequency division control signal and signals from the first node and the second node; and a frequency division control module electrically connected between the stage transmission module and the output module and controlling signal transmission between the output module and one of the first node and the second node based on the frequency division control signal and the signal from the first node or the second node;

wherein the frequency division control module comprises:

a first control transistor, wherein a control terminal of the first control transistor is electrically connected to the first node or the second node, and an input terminal of the first control transistor is electrically connected to the frequency division control line; and a second control transistor, wherein a control terminal of the second control transistor is electrically connected to an output terminal of the first control transistor, an input terminal of the second control transistor is electrically connected to one of the first node and the second node, and an output terminal of the second control transistor is electrically connected to the output module.

2. The gate driving unit of claim 1, wherein the output module comprises:

a first output transistor, wherein a control terminal of the first output transistor is electrically connected to the output terminal of the second control transistor, an input terminal of the first output transistor is electrically connected to a first voltage terminal, and an output terminal of the first output transistor is electrically connected to a signal output terminal of the gate driving circuit outputting the gate control signal;

a second output transistor, wherein a control terminal of the second output transistor is electrically connected to another one of the first node and the second node, an input terminal of the second output transistor is electrically connected to a second voltage terminal, and an output terminal of the second output transistor is electrically connected to the signal output terminal; and a first capacitor connected in series between the input terminal of the first output transistor and the control terminal of the first output transistor.

3. The gate driving unit of claim 2, wherein the input terminal of the second control transistor is electrically connected to the first node, and a first voltage transmitted from the first voltage terminal is greater than a second voltage transmitted from the second voltage terminal; or the input terminal of the second control transistor is electrically connected to the second node, and the first voltage transmitted from the first voltage terminal is less than the second voltage transmitted from the second voltage terminal.

4. The gate driving unit of claim 2, wherein the frequency division control module further comprises:

a second capacitor connected in series between the input terminal of the first output transistor and the control terminal of the second output transistor.

5. The gate driving unit of claim 2, wherein the frequency division control module further comprises:

a third control transistor, wherein a control terminal of the third control transistor is electrically connected to the first node or the second node, an input terminal of the third control transistor is electrically connected to a first constant voltage terminal, and an output terminal of the third control transistor is electrically connected to the control terminal of the first output transistor.

6. The gate driving unit of claim 1, wherein the frequency division control module further comprises:

a first stabilization transistor, wherein a control terminal of the first stabilization transistor is electrically connected to the frequency division control line, and an input terminal of the first stabilization transistor is electrically connected to a second constant voltage terminal; and a second stabilization transistor, wherein a control terminal of the second stabilization transistor is electrically connected to the control terminal of the first control transistor, an input terminal of the second stabilization transistor is electrically connected to an output terminal of the first stabilization transistor, and an output terminal of the second stabilization transistor is electrically connected to the control terminal of the second control transistor.

7. The gate driving unit of claim 1, wherein the stage transmission module comprises:

a first node control module electrically connected to a clock signal line and the first node and controlling the signal from the first node based on a clock signal transmitted via the clock signal line;

a second node control module electrically connected to the clock signal line and the second node and controlling the signal from the second node based on the upper-stage stage transmission signal and the clock signal; and a stage transmission output module electrically connected to the first node, the second node, and a stage transmission output terminal of the gate driving circuit and outputting the current-stage stage transmission signal to the lower stage of gate driving circuit via the stage transmission output terminal based on the signals from the first node and the second node.

8. The gate driving unit of claim 7, wherein the clock signal line comprises a first clock signal line and a second clock signal line; the first node control module comprises a first transistor, a second transistor, a third transistor, a fourth transistor, a fifth transistor, and a third capacitor; the second node control module comprises a sixth transistor, a seventh transistor, an eighth transistor, and a fourth capacitor; the stage transmission output module comprises a first stage transmission output transistor, a second stage transmission output transistor, and a fifth capacitor;

wherein a control terminal of the first transistor is electrically connected to the first clock signal line, and an input terminal of the first transistor is electrically connected to a third voltage terminal; a control terminal of the second transistor is electrically connected to the second node, an input terminal of the second transistor is electrically connected to the first clock signal line, and an output terminal of the second transistor is electrically connected to an output terminal of the first transistor; a control terminal of the third transistor is electrically connected to the output terminal of the first transistor, and an input terminal of the third transistor is electrically connected to the second clock signal line;

a control terminal of the fourth transistor is electrically connected to the second clock signal line, and an input terminal and an output terminal of the fourth transistor are electrically connected between an output terminal of the third transistor and the first node; a control terminal of the fifth transistor is electrically connected to the second node, an input terminal of the fifth transistor is electrically connected to a fourth voltage terminal, and an output terminal of the fifth transistor is electrically connected to the first node; the third capacitor is connected in series between the control terminal of the third transistor and an output terminal of the third transistor; and a control terminal of the sixth transistor is electrically connected to the first clock signal line, an input terminal of the sixth transistor is configured to receive the upper-stage stage transmission signal, and an output terminal of the sixth transistor is electrically connected to the second node; a control terminal of the seventh transistor is electrically connected to the output terminal of the first transistor, an input terminal of the seventh transistor is electrically connected to the fourth voltage terminal, an output terminal of the seventh transistor is electrically connected to an output terminal of the eighth transistor, an input terminal of the eighth transistor is electrically connected to the second clock signal line, and a control terminal of the eighth transistor is electrically connected to the second node; the fourth capacitor is connected in series between the control terminal of the eighth transistor and the output terminal of the eighth transistor; and a control terminal of the first stage transmission output transistor is electrically connected to the first node, an input terminal of the first stage transmission output transistor is electrically connected to the fourth voltage terminal, and an output terminal of the first stage transmission output transistor is electrically connected to the stage transmission output terminal; a control terminal of the second stage transmission output transistor is electrically connected to the second node, an input terminal of the second stage transmission output transistor is electrically connected to the third voltage terminal, and an output terminal of the second stage transmission output transistor is electrically connected to the stage transmission output terminal; the fifth capacitor is connected in series between the input terminal of the first stage transmission output transistor and the control terminal of the first stage transmission output transistor.

9. The gate driving unit of claim 8, wherein the stage transmission module further comprises a shielding module including a first shielding transistor and a second shielding transistor, wherein a control terminal of the first shielding transistor and a control terminal of the second shielding transistor are both electrically connected to the third voltage terminal, an input terminal and an output terminal of the first shielding transistor are electrically connected between an output terminal of the first transistor and the control terminal of the third transistor, an input terminal of the second shielding transistor is electrically connected to the output terminal of the sixth transistor via a first sub-node, and an output terminal of the second shielding transistor is electrically connected to the control terminal of the second stage transmission output transistor via a second sub-node;

wherein the second node comprises the first sub-node and the second sub-node, the control terminal of the first control transistor is electrically connected to one of the first sub-node and the second sub-node, and the input terminal of the second control transistor is electrically connected to one of the first node and the second sub-node.

10. A display device, comprising a display panel and a gate driving unit, wherein the display panel comprises a plurality of sub-pixels and a plurality of scanning lines, each of the plurality of sub-pixels comprises a light emitting device and a pixel driving circuit for driving the light emitting device to emit light, and the pixel driving circuit comprises at least one transistor;

the gate driving unit comprises a frequency division control line and a plurality of cascaded gate driving circuits, wherein the frequency division control line transmits a frequency division control signal to the plurality of cascaded gate driving circuits, and each of the gate driving circuits comprises:

a stage transmission module receiving an upper-stage stage transmission signal and outputting a current-stage stage transmission signal to a lower-stage gate of driving circuit;

an output module electrically connected to a first node and a second node in the stage transmission module and outputting a gate control signal based on the frequency division control signal and signals from the first node and the second node; and a frequency division control module electrically connected between the stage transmission module and the output module and controlling signal transmission between the output module and one of the first node and the second node based on the frequency division control signal and the signal from the first node or the second node;

wherein gate control signals output from the plurality of cascaded gate driving circuits are transmitted to control terminals of the transistors of the plurality of pixel driving circuits via the plurality of scanning lines; and wherein the frequency division control module comprises:

a first control transistor, wherein a control terminal of the first control transistor is electrically connected to the first node or the second node, and an input terminal of the first control transistor is electrically connected to the frequency division control line; and a second control transistor, wherein a control terminal of the second control transistor is electrically connected to an output terminal of the first control transistor, an input terminal of the second control transistor is electrically connected to one of the first node and the second node, and an output terminal of the second control transistor is electrically connected to the output module.

11. The display device of claim 10, wherein the output module includes:

a first output transistor, wherein a control terminal of the first output transistor is electrically connected to the output terminal of the second control transistor, an input terminal of the first output transistor is electrically connected to a first voltage terminal, and an output terminal of the first output transistor is electrically connected to a signal output terminal of the gate driving circuit outputting the gate control signal;

a second output transistor, wherein a control terminal of the second output transistor is electrically connected to another one of the first node and the second node, an input terminal of the second output transistor is electrically connected to a second voltage terminal, and an output terminal of the second output transistor is electrically connected to the signal output terminal; and a first capacitor connected in series between the input terminal of the first output transistor and the control terminal of the first output transistor.

12. The display device of claim 11, wherein the input terminal of the second control transistor is electrically connected to the first node, and a first voltage transmitted from the first voltage terminal is greater than a second voltage transmitted from the second voltage terminal; or the input terminal of the second control transistor is electrically connected to the second node, and the first voltage transmitted from the first voltage terminal is less than the second voltage transmitted from the second voltage terminal.

13. The display device of claim 11, wherein the frequency division control module further comprises:

a second capacitor connected in series between the input terminal of the first output transistor and the control terminal of the second output transistor.

14. The display device of claim 11, wherein the frequency division control module further comprises:

a third control transistor, wherein a control terminal of the third control transistor is electrically connected to the first node or the second node, an input terminal of the third control transistor is electrically connected to a first constant voltage terminal, and an output terminal of the third control transistor is electrically connected to the control terminal of the first output transistor.

15. The display device of claim 10, wherein the frequency division control module further comprises:

a first stabilization transistor, wherein a control terminal of the first stabilization transistor is electrically connected to the frequency division control line, and an input terminal of the first stabilization transistor is electrically connected to a second constant voltage terminal; and a second stabilization transistor, wherein a control terminal of the second stabilization transistor is electrically connected to the control terminal of the first control transistor, an input terminal of the second stabilization transistor is electrically connected to an output terminal of the first stabilization transistor, and an output terminal of the second stabilization transistor is electrically connected to the control terminal of the second control transistor.

16. The display device of claim 10, wherein the pixel driving circuit further comprises:

a driving transistor connected in series with the light emitting device between a first power supply line and a second power supply line and generating a driving current to drive the light emitting device to emit light;

a compensation transistor having an input terminal and an output terminal electrically connected between a control terminal of the driving transistor and an output terminal of the driving transistor; and a reset transistor having an input terminal and an output terminal electrically connected between a first reset line and the control terminal of the driving transistor;

wherein each of the scanning lines is electrically connected to a control terminal of the compensation transistor or a control terminal of the reset transistor of each of a plurality of sub-pixels located in a same row, and the transistor comprises at least one of the compensation transistor and the reset transistor.

17. The display device of claim 16, wherein the plurality of scanning lines includes a plurality of first sub-scanning lines and a plurality of second sub-scanning lines; the display device comprises two gate driving units;

wherein a plurality of cascaded gate driving circuits included in one of the two gate driving units are electrically connected to the control terminals of the compensation transistors of the plurality of sub-pixels via the plurality of first sub-scanning lines; and a plurality of cascaded gate driving circuits included in another one of the two gate driving units are electrically connected to the control terminals of the reset transistors of the plurality of sub-pixels via the plurality of second sub-scanning lines.

18. The display device of claim 17, wherein the display panel includes a display area and first and second non-display areas located on opposite sides of the display area; and wherein the one of the gate driving units is located in the first non-display area, and the another one of the gate driving units is located in the second non-display area.

* * * * *